United States Patent
Li et al.

(10) Patent No.: US 12,332,828 B2
(45) Date of Patent: *Jun. 17, 2025

(54) GRAPH ACCELERATION SOLUTION WITH CLOUD FPGA

(71) Applicant: Alibaba (China) Co., Ltd., Hangzhou (CN)

(72) Inventors: Shuangchen Li, Sunnyvale, CA (US); Dimin Niu, Sunnyvale, CA (US); Hongzhong Zheng, Los Gatos, CA (US); Zhe Zhang, Beijing (CN); Yuhao Wang, Sunnyvale, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 291 days.

This patent is subject to a terminal disclaimer.

(21) Appl. No.: 18/072,062

(22) Filed: Nov. 30, 2022

(65) Prior Publication Data

US 2024/0004824 A1    Jan. 4, 2024

(30) Foreign Application Priority Data

Jul. 1, 2022    (CN) .......................... 202210774994.7

(51) Int. Cl.
*G06F 13/42*    (2006.01)
*G06F 3/06*    (2006.01)

(52) U.S. Cl.
CPC ........ *G06F 13/4221* (2013.01); *G06F 3/0611* (2013.01); *G06F 3/0659* (2013.01); *G06F 3/0673* (2013.01); *G06F 2213/0026* (2013.01)

(58) Field of Classification Search
None
See application file for complete search history.

(56) References Cited

U.S. PATENT DOCUMENTS

| | | |
|---|---|---|
| 2020/0234145 A1 | 7/2020 | Dai et al. |
| 2020/0279151 A1 | 9/2020 | Li et al. |
| 2020/0293838 A1 | 9/2020 | Li et al. |
| 2020/0326934 A1 | 10/2020 | Tepper et al. |
| 2020/0401891 A1 | 12/2020 | Xu et al. |
| 2021/0133990 A1 | 5/2021 | Eckart et al. |
| 2021/0158929 A1 | 5/2021 | Sjolund |
| 2021/0201107 A1 | 7/2021 | Laszlo et al. |

(Continued)

*Primary Examiner* — Farley Abad
*Assistant Examiner* — Dayton Lewis-Taylor
(74) *Attorney, Agent, or Firm* — Sheppard Mullin Richter & Hampton LLP

(57) ABSTRACT

This application describes systems and methods for facilitating memory access for graph neural network (GNN) processing. An example method includes fetching, by an access engine circuitry implemented on a circuitry board, a portion of structure data of a graph from a pinned memory in a host memory of a host via a first peripheral component interconnect express (PCIe) connection; performing node sampling using the fetched portion of the structure data of the graph to select one or more sampled nodes; fetching, by the access engine circuitry, a portion of attribute data of the graph from the pinned memory via the first PCIe connection; sending the fetched portion of the attribute data of the graph to one or more processors; and performing, by the one or more processors, GNN processing for the graph using the fetched portion of the attribute data of the graph.

20 Claims, 13 Drawing Sheets

1300

1310: fetching a portion of structure data of a graph from a pinned memory in a host memory of a host by an access engine circuitry implemented on a circuitry board 1320: performing node sampling using the fetched portion of the structure data of the graph to select one or more sampled nodes 1330: fetching a portion of attribute data of the graph the host memory according to the selected one or more sampled nodes 1340: sending the fetched portion of the attribute data of the graph to one or more processors 1350: performing GNN processing for the graph using the fetched portion of the attribute data by the one or more processors

(56) References Cited

U.S. PATENT DOCUMENTS

| | | |
|---|---|---|
| 2021/0201119 A1 | 7/2021 | Laszlo et al. |
| 2021/0334300 A1 | 10/2021 | Banda |
| 2021/0334606 A1 | 10/2021 | Du et al. |
| 2021/0383228 A1 | 12/2021 | Velickovic et al. |
| 2022/0044068 A1 | 2/2022 | Chai et al. |
| 2022/0044074 A1 | 2/2022 | Li et al. |
| 2022/0044121 A1 | 2/2022 | Pituwalakankanamge et al. |
| 2022/0058818 A1 | 2/2022 | Qi et al. |
| 2022/0092412 A1 | 3/2022 | Srivastava et al. |
| 2022/0135086 A1 | 5/2022 | Mahjourian et al. |
| 2022/0188700 A1 | 6/2022 | Khavronin et al. |
| 2022/0309685 A1 | 9/2022 | Ramezani et al. |
| 2023/0128180 A1* | 4/2023 | Liu ................... G06F 9/3004 706/26 |
| 2023/0153568 A1* | 5/2023 | Guan ................... G06N 3/04 706/25 |

\* cited by examiner

1300

1310: fetching a portion of structure data of a graph from a pinned memory in a host memory of a host by an access engine circuitry implemented on a circuitry board

1320: performing node sampling using the fetched portion of the structure data of the graph to select one or more sampled nodes

1330: fetching a portion of attribute data of the graph the host memory according to the selected one or more sampled nodes

1340: sending the fetched portion of the attribute data of the graph to one or more processors

1350: performing GNN processing for the graph using the fetched portion of the attribute data by the one or more processors

FIG. 13

GRAPH ACCELERATION SOLUTION WITH CLOUD FPGA

CROSS-REFERENCE TO RELATED APPLICATION

This application claims priority to and benefits of Chinese patent Application No. 202210774994.7, filed with the China National Intellectual Property Administration (CNIPA) on Jul. 1, 2022. The entire contents of the above-identified application are incorporated herein by reference.

TECHNICAL FIELD

The disclosure relates generally to systems for performing memory accessing.

BACKGROUND

While traditional deep learning models are good at pattern recognition and data mining by capturing hidden patterns of Euclidean data (e.g., images, text, videos), graph neural networks (GNNs) have shown to extend the power of machine learning to non-Euclidean domains represented as graphs with complex relationships and interdependencies between objects. Research has shown that GNNs can exceed state-of-the-art performance on applications ranging from molecular inference to community detection.

GNNs can be a very effective model for unstructured data modeling and processing. Recently, GNNs are becoming more and more utilized in applications such as recommendation systems, risk control systems, etc. Graph data may be unstructured. As a result, accessing graph data may result in random memory accesses on one or more memories storing the graph data. The location and configuration of the one or more memories storing the graph data can have profound implications on the overall efficiency and the cost of the system.

SUMMARY

Various embodiments of the present specification may include hardware circuits, systems, methods for efficient memory allocation for sparse matrix multiplications.

According to one aspect, a system comprises a host comprising a host memory; one or more processors; and a circuitry board, wherein: the circuitry board is communicatively coupled with the host via a first peripheral component interconnect express (PCIe) connection, the circuitry board comprising: an access engine circuitry configured to: fetch a portion of the structure data of the graph from a pinned memory in the host memory via the first PCIe connection; perform node sampling using the fetched portion of the structure data to select one or more sampled nodes of the graph; fetch a portion of the attribute data of the graph from the pinned memory via the PCIe first connection according to the selected one or more sampled nodes; and send the fetched portion of the attribute data of the graph to the one or more processors, and the one or more processors are configured to perform graph neural network (GNN) processing for the graph using the portion of the attribute data of the graph.

In some embodiments, the circuitry board is implemented on a field programmable gate array (FPGA) located on the circuitry board.

In some embodiments, the one or more processors are a part of the host, and the access engine circuitry is further configured to send the fetched portion of the attribute data of the graph to the one or more processors via the first PCIe connection.

In some embodiments, the access engine circuitry is communicatively coupled with another access engine circuitry via a fabric interconnect, and the access engine circuitry is further configured to: fetch another portion of the structure data of the graph from the other access engine circuitry via the fabric interconnect; perform node sampling using the fetched portions of the structure data to select one or more sampled nodes of the graph; fetch another portion of the attribute data of the graph from the other access engine circuitry via the fabric interconnect according to the selected one or more sampled nodes; and send the fetched portions of the attribute data of the graph to the one or more processors, and the one or more processors are further configured to perform graph neural network (GNN) processing for the graph using the portions of the attribute data of the graph.

In some embodiments, the one or more processors are communicatively coupled with the host via a second PCIe connection, and the access engine circuitry is further configured to send the fetched portion of the attribute data of the graph to the one or more processors via the first PCIe connection to the host, which is further configured to forward the fetched portion of the attribute data via the second PCIe connection to the one or more processors.

In some embodiments, the host is communicatively coupled with another host via a network connection, and the access engine circuitry is further configured to: fetch another portion of the structure data of the graph from the other host via the network connection; perform node sampling using the fetched portions of the structure data to select one or more sampled nodes of the graph; fetch another portion of the attribute data of the graph from the other access engine circuitry via the network connection according to the selected one or more sampled nodes; and send the fetched portions of the attribute data of the graph to the one or more processors, and the one or more processors are further configured to perform graph neural network (GNN) processing for the graph using the portions of the attribute data of the graph.

In some embodiments, the one or more processors are central processing units (CPUs), graphics processing units (GPUs), tensor processing units (TPU), neural processing units (NPUs), or graph neural network processing units.

The host memory comprises one or more double data rate (DDR) synchronous dynamic random access memory (SDRAM).

According to another aspect, a method comprises fetching, by an access engine circuitry implemented on a circuitry board, a portion of structure data of a graph from a pinned memory in a host memory of a host via a first peripheral component interconnect express (PCIe) connection, wherein the access engine circuitry is communicatively coupled with the host via the first PCIe connection; performing, by the access engine circuitry, node sampling using the fetched portion of the structure data of the graph to select one or more sampled nodes; fetching, by the access engine circuitry, a portion of attribute data of the graph from the pinned memory via the first PCIe connection; sending, by the access engine circuitry, the fetched portion of the attribute data of the graph to one or more processors; and performing, by the one or more processors, graph neural network (GNN) processing for the graph using the fetched portion of the attribute data of the graph.

According to another aspect, non-transitory computer-readable storage media store instructions that, when executed by one or more processors, cause the one or more processors to perform operations comprising fetching, by an access engine circuitry implemented on a circuitry board, a portion of structure data of a graph from a pinned memory in a host memory of a host via a first peripheral component interconnect express (PCIe) connection, wherein the access engine circuitry is communicatively coupled with the host via the first PCIe connection; performing, by the access engine circuitry, node sampling using the fetched portion of the structure data of the graph to select one or more sampled nodes; fetching, by the access engine circuitry, a portion of attribute data of the graph from the pinned memory via the first PCIe connection; sending, by the access engine circuitry, the fetched portion of the attribute data of the graph to one or more processors; and performing, by the one or more processors, graph neural network (GNN) processing for the graph using the fetched portion of the attribute data of the graph.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 13 is an example method for accelerating GNN processing with a host memory, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Data may be structured or unstructured. For structured data, information may be arranged according to a pre-set data model or schema. For unstructured data, information may not be arranged using a preset-data model or a pre-defined manner. For example, a text file (e.g., emails, reports, etc.) may include information (e.g., individual letters or words) that does not have a pre-defined structure. As a result, the unstructured data may include irregularities and ambiguities that make it difficult to understand using traditional programs or data structures. Moreover, accessing unstructured data from a computer memory can involve a large number of random memory accessing, which can make memory accessing tedious and inefficient.

One way to represent unstructured data is by using graphs. A graph is a data structure comprising two components—nodes (or vertices) and edges. For example, a graph G may be defined as a collection of a set of nodes V and a set of edges E connecting the set of nodes. A node in a graph may have a set of features or attributes (e.g., a user profile in a graph representing a social network). A node may be defined as an adjacent node of another node, if they are connected by an edge. The graph may be a highly flexible data structure, as the graph may not require pre-defined rules to determine how many nodes it contains or how the nodes are connected by edges. Because the graph may provide great flexibility, it is one of the data structures that are widely used to store or represent unstructured data (e.g., text files). For example, the graph can store data that has a relationship structure, such as between buyers or products in an online shopping platform.

Figure 1:
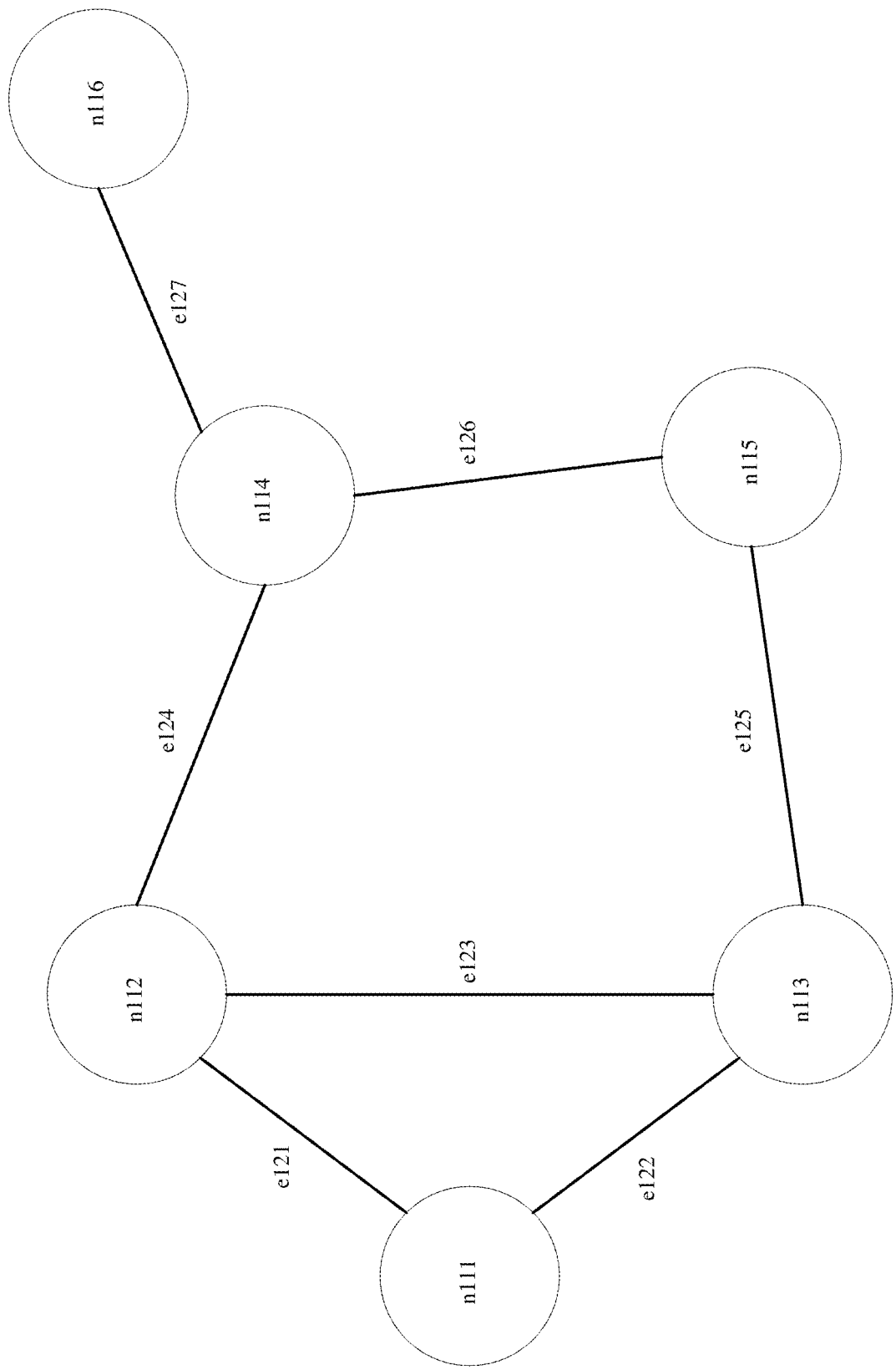
FIG. 1 is a schematic of an example graph, according to some embodiments of this specification.

FIG. 1 is a schematic of an example graph, according to some embodiments of this specification. As shown in FIG. 1, a graph 100 includes nodes n111, n112, n113, n114, n115, and n116. Further, the graph 100 includes edges e121, e122, e123, e124, e125, e126, and e127. Each of the nodes has one or more adjacent nodes. For example, nodes n112 and n113 are adjacent to node n111, since node n112 shares with node n111 edge e121 and node n113 shares with node n111 edge e122.

When storing a graph in computer memory, the nodes, edges, and attributes may be stored in many different data structures. One way to store a graph is to separate the attribute data from the corresponding nodes. For example, node identifiers may be stored in an array, with each node identifier providing an address or a pointer that points to the location of the attribute data for the corresponding node. The attributes for all nodes may be stored together, and they may be accessed by reading the address or the pointer stored in the corresponding node identifiers. By separating the attribute data from the corresponding nodes, the data structure may be able to provide faster traversing access on the graph.

A graph neural network (GNN) is a type of neural network that may directly operate on a graph. The GNN may be more suitable than traditional neural networks (e.g., a convolutional neural network) for operations on a graph, since the GNN may be better equipped to accommodate the arbitrary size of the graph or the complex topology of the graph. The GNN may perform inference on data described in graph formats. The GNN is capable of performing node-level, edge-level, or graph-level prediction tasks.

GNN processing may involve GNN training and GNN inference, both of which may involve GNN computations. A typical GNN computation on a node (or vertex) may involve aggregating its neighbor's (direct neighbors or each neighbor's neighbors) features (e.g., attribute data) and then computing new activations of the node for determining a feature representation (e.g., feature vector) of the node. Therefore, GNN processing for a small number of nodes often requires input features of a significantly larger number of nodes. Taking all neighbors for message aggregation is too costly since the nodes needed for input features would easily cover a large portion of the graph, especially for real-world graphs that are colossal in size (e.g., with hundreds of millions of nodes with billions of edges).

To make GNN more practical for these real-word applications, node sampling is often adopted to reduce the number of nodes to be involved in the message/feature aggregation. For example, positive sampling and negative sampling may be used to determine the optimization objective and the resulted variance in the GNN processing. For a given root node whose feature representation is being computed, the positive sampling may sample those graph nodes that have connections (direct or indirect) via edges with the root node (e.g., connected to and within a preset distance from the root node); the negative sampling may sample those graph nodes that are not connected via edges with the root graph node (e.g., outside of the preset distance from the root node). The positively sampled nodes and the negatively sampled nodes may be used to train the feature representation of the root node with different objectives.

Figure 2:
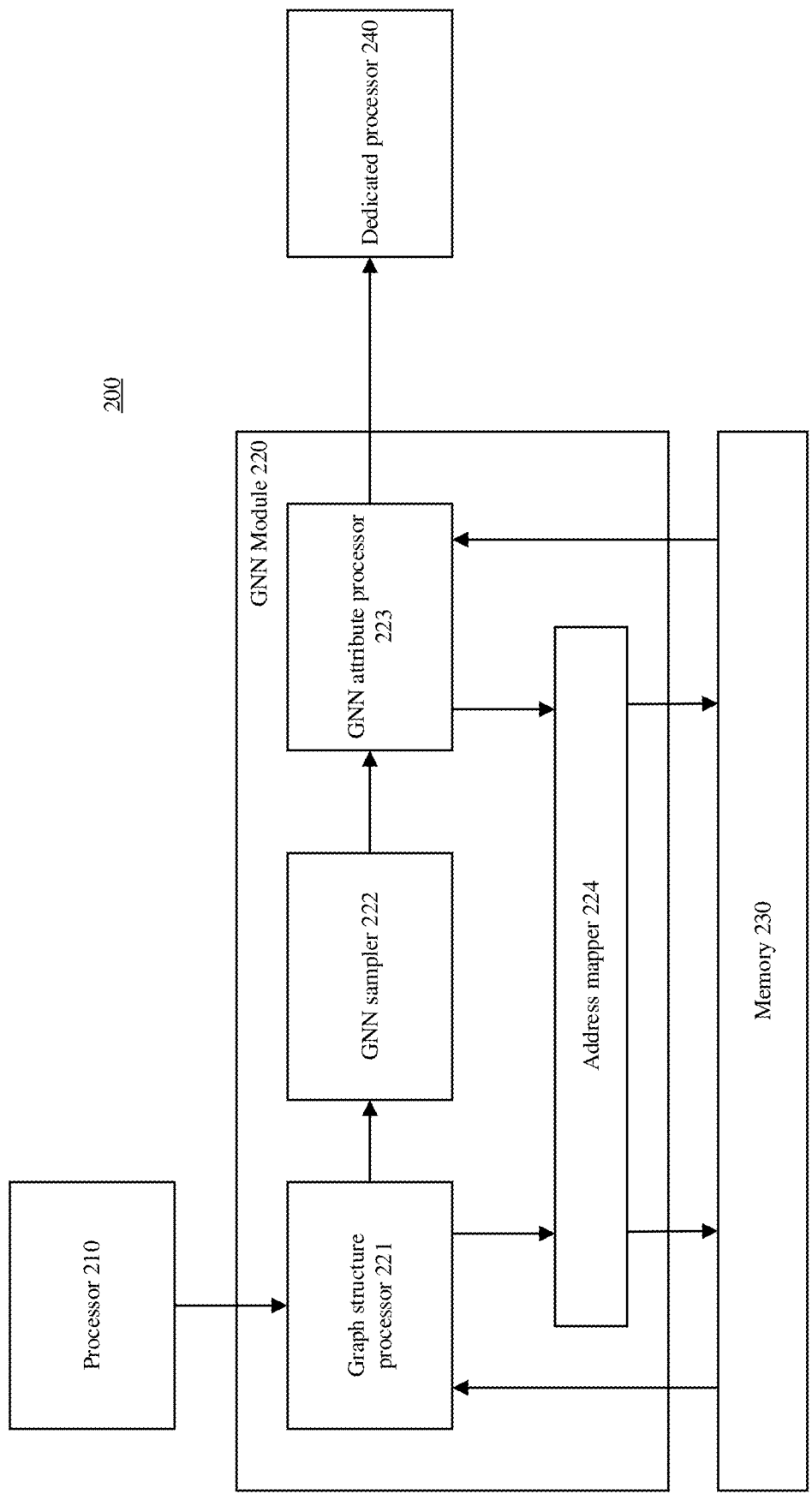
FIG. 2 is a schematic of an example system using GNN accelerator architecture, according to some embodiments of this specification.

To perform GNN computations, a system may retrieve graph data from a memory, and send the data to one or more processors for processing. FIG. 2 is a schematic of an example system using GNN accelerator architecture, according to some embodiments of this specification. As shown in FIG. 2, a system 200 includes one or more processors 210, a GNN accelerator 220, a memory 230, and one or more dedicated processors 240. In some embodiments, the one or more processors 210 include one or more central processing units (CPU). In some embodiments, the one or more dedicated processors 240 may include one or more CPUs, one or more graphic processing units (GPU), one or more tensor processing units (TPU), one or more neural processing units (NPU), one or more dedicated graph neural network processing units, etc. In some embodiments, the memory 230 may include Synchronous Dynamic Random-Access Memory (SDRAM), such as a Double Data Rate (DDR) SDRAM.

As shown in FIG. 2, the GNN accelerator 220 may receive instructions and information on a GNN from the one or more processors 210, and extract data related to the GNN from the memory 230. After receiving the data from the memory 230, the GNN accelerator 220 may preprocess the data, and send the preprocessed data to the one or more dedicated processors 240 for further processing.

In some embodiments, as shown in FIG. 2, the GNN accelerator 220 may include a graph structure processor 221, a GNN sampler 222, a GNN attribute processor 223, and an address mapper 224. The graph structure processor 221 may be configured to receive instructions and information on the GNN from the one or more processors 210, and fetch information on one or more root nodes and their edges from the memory 230. The graph structure processor 221 may then send the fetched information to the GNN sampler 222.

The GNN sampler 222 may be configured to select, according to the edge information of the one or more root nodes, one or more sampled nodes for GNN processing. In some embodiments, the GNN sampler 222 may select the one or more sampled nodes according to positive sampling or negative sampling. For example, based on the positive sampling, the one or more sampled nodes may be selected from nodes that have a connection via edges with the one or more root nodes (e.g., adjacent to the one or more root nodes). Based on the negative sampling, the one or more sampled nodes may be selected from nodes that are not directly connected via edges with the one or more root nodes (e.g., not adjacent or close to the one or more root nodes). In some embodiments, the positive sampling may select from the neighboring nodes of the root node that are connected to and within a preset distance from the root node. The connection may be a direct (one edge between the source node to the destination node) or indirect (multiple edges from the source node to the destination node) connection. The "preset distance" may be configured according to the implementation. For example, if the preset distance is one, it means only the directly connected neighboring nodes are selected for positive sampling. If the preset distance is infinity, it means that the nodes are not connected, whether directly or indirectly. The negative sampling may select from nodes that are outside the preset distance from the root node. It is appreciated that the sampled nodes may be selected using any algorithms other than the positive sampling and the negative sampling.

Having selected the sampled nodes, the GNN sampler 222 may send the selection information of the sampled nodes to the GNN attribute processor 223. Based on the information of the sampled nodes, the GNN attribute processor 223 may be configured to fetch from the memory 230 information of the sampled nodes. In some embodiments, the information of the sampled nodes may include one or more features or attributes of each of the sampled nodes (also called attribute data). The GNN attribute processor 223 may be further configured to send the fetched information of the sampled nodes and the information of the one or more root nodes and their edges to the dedicated processors 240. The dedicated processors 240 may perform GNN processing based on the information received from the GNN attribute processor 223.

In some embodiments, the graph structure processor 221 and the GNN attribute processor 223 may fetch information from the memory 230 using the address mapper 224. The address mapper may be configured to provide hardware address information in the memory 230 based on information of nodes and edges. For example, a root node as a part of an input GNN may be identified using an identifier n111 (e.g., node n111 of FIG. 1). If the graph structure processor 221 intends to fetch information of the node n111 (e.g., attribute data of the node n111), the graph structure processor 221 may provide the identifier n111 to the address mapper 224, and the address mapper 224 may determine a physical address in the memory 230 where the information for the node n111 (e.g., the attribute data of the node n111) is stored. In some embodiments, the address mapper 224 may also determine one or more physical addresses in the memory 230 where information on the edges of the node n111 is stored (e.g., edges e121 and e122 of FIG. 1).

Figure 3:
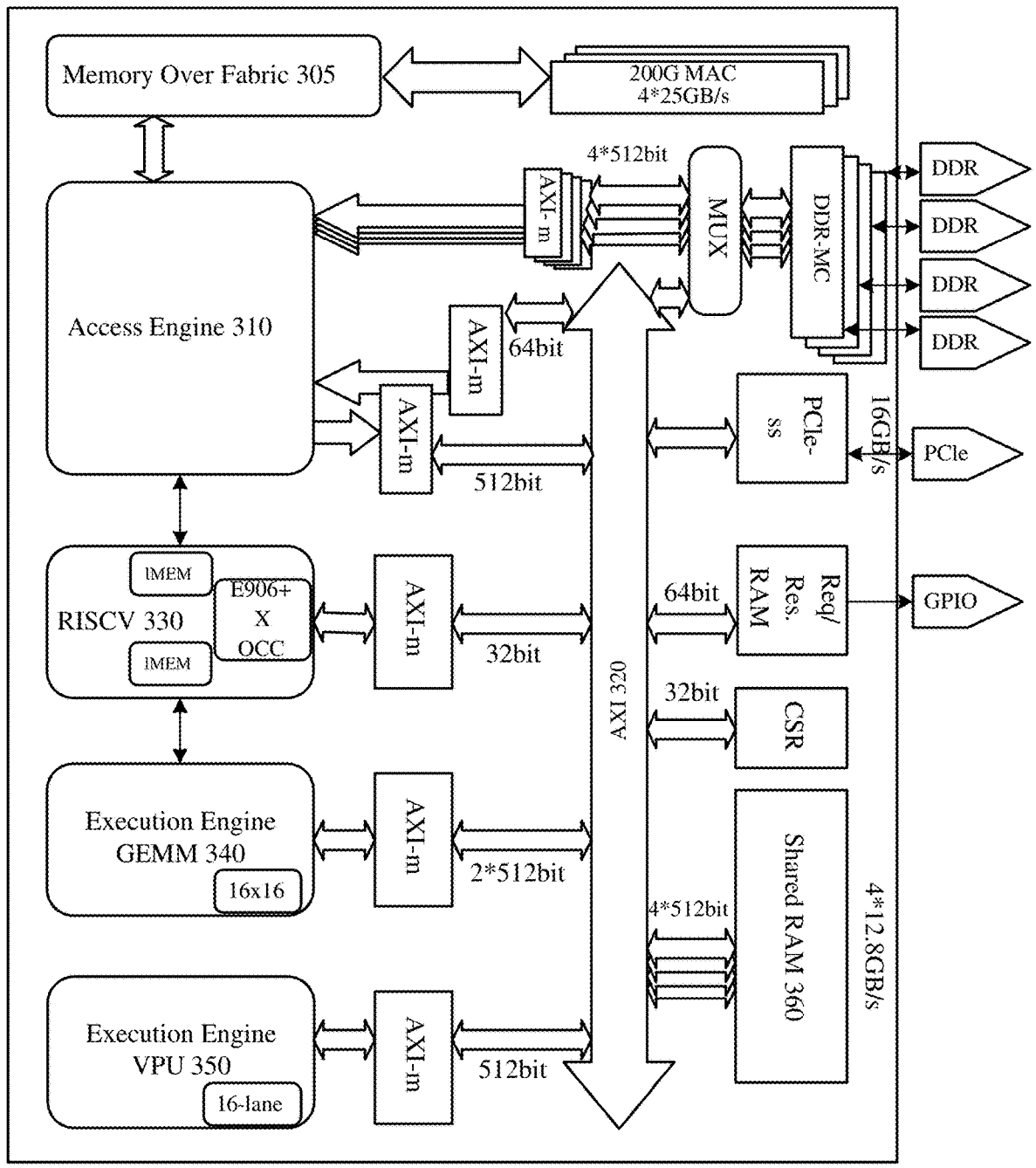
FIG. 3 is a schematic of an example system for accelerating GNN performance, according to some embodiments of this specification.

The system 200 shown in FIG. 2 may be used to accelerate GNN memory access for many different systems in accelerating GNN performance. FIG. 3 is a schematic of an example system for accelerating GNN performance, according to some embodiments of this specification. As shown in FIG. 3, an acceleration system 300 includes a memory over fabric (MoC) 305, an access engine 310, a RISCV 330, a General Matrix Multiply (GEMM) execution engine 340, and a vector processing units (VPU) execution engine 350. The access engine 310 shown in FIG. 3 may be similar to the GNN module 220 shown in FIG. 2. The access engine 310 may be configured to retrieve, from memory (e.g., DDRs as shown in FIG. 2), data needed for performing GNN calculations. For example, the access engine 310 may retrieve node identifiers, edge identifiers, and attribute data corresponding to the node identifiers. The data retrieved by the access engine 310 may be provided to the execution engines (e.g., the GEMM execution engine 340 or the VPU execution engine 350) or processors for GNN-related calculations. As shown in FIG. 3, both types of engines may perform specific GNN-related calculations in an accelerated manner.

Figure 4:
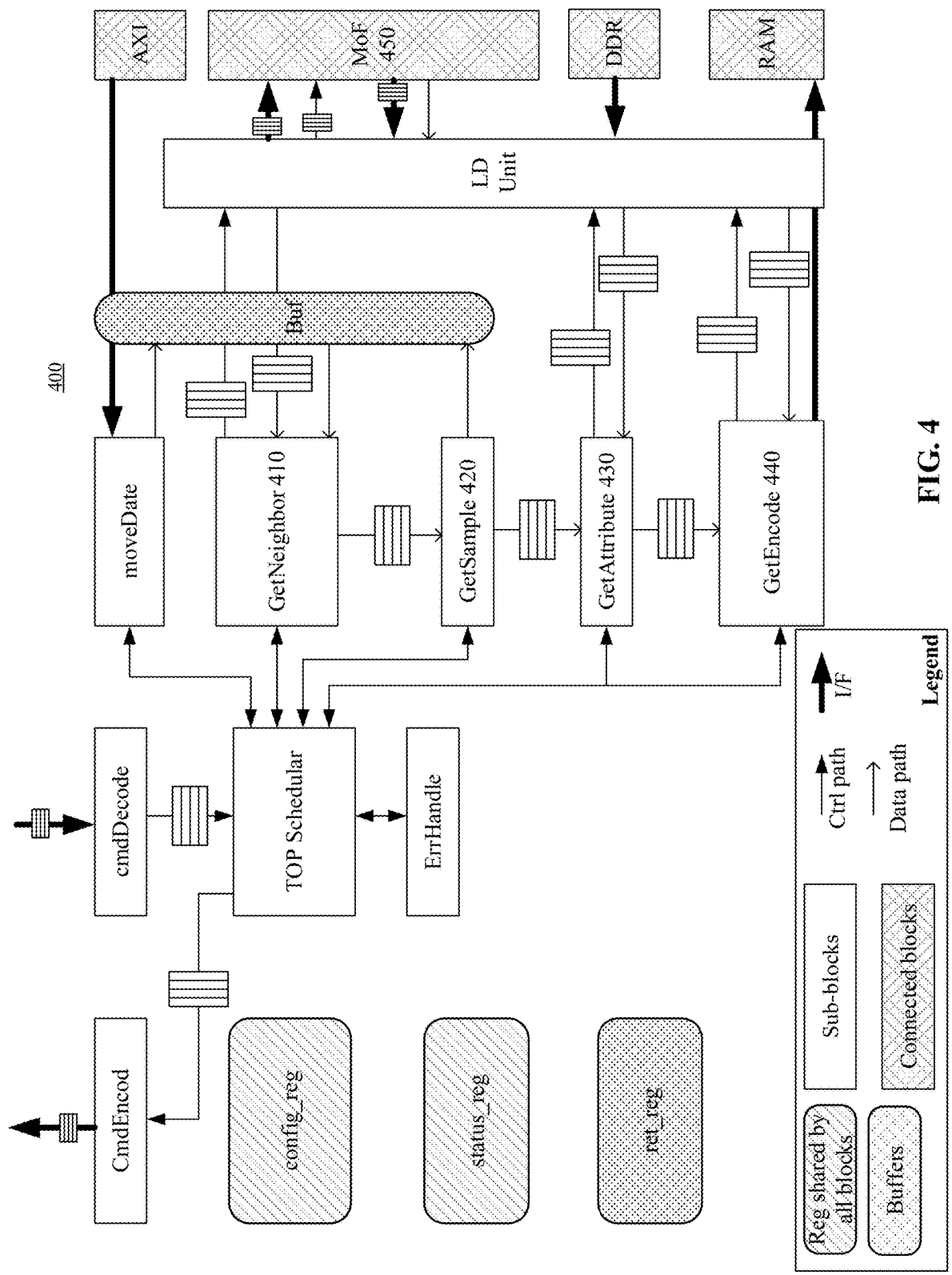
FIG. 4 is a schematic of an example GNN access engine, according to some embodiments of this specification.

Although the system 300 may include accelerated engines and processors to speed up GNN-related calculations, it is the access engine 310 that may become a bottleneck for the overall performance of the system 300, since the data retrieval performed by the access engine may be slower than the execution engines performing data processing. FIG. 4 is a schematic of an example GNN access engine, according to some embodiments of this specification. It is appreciated that an access engine 400 shown in FIG. 4 may be similar to the access engine 310 shown in FIG. 3. As shown in FIG. 4, the access engine 400 may include a GetNeighbor module 410, a GetSample module 420, a GetAttribute module 430, and a GetEncode module 440.

In some embodiments, the GetNeighbor module 410 is configured to access or identify adjacent nodes for an input node identifier. For example, similar to the graph structure processor 221 shown in FIG. 2, the GetNeighbor module 410 may receive instructions and information on the GNN, and fetch information on one or more nodes, their edges, and their neighbors (adjacent nodes) from DDRs (e.g., corresponding to the memory 230 of FIG. 2). The GetNeighbor module 410 may then send the fetched information to the GetSample module 420 (e.g., corresponding to the GNN Sampler 222 of FIG. 2).

In some embodiments, the GetSample module 420 is configured to receive information on one or more nodes from the GetNeighbor module 410 and perform node sampling on the one or more nodes for GNN processing. For example, similar to the GNN sampler 222 shown in FIG. 2, The GetSample module 420 may be configured to select, according to the edge information of the one or more nodes, one or more sampled nodes for GNN processing. In some embodiments, the GNN sampler 222 may select the one or more sampled nodes according to positive sampling and/or negative sampling. Having selected the sampled nodes, the GetSample module 420 may send the selection information of the sampled nodes to the GetAttribute module 430.

In some embodiments, the GetAttribute module 430 may be configured to receive information of selected or sampled nodes from the GetSample module 420 and fetch attribute information on the sampled nodes from memory (e.g., DDRs shown in FIG. 4 or memory 230 shown in FIG. 2). For example, similar to the GNN attribute processor 223, the GetAttribute module 430 may be configured to fetch from the memory 230 attribute data of the sampled nodes based on the received sampled nodes (e.g., sampled node identifiers). In some embodiments, the GetAttribute module may need to fetch attribute information on the sampled nodes from remote locations. For example, the GetAttribute module may need to fetch the attribute information from other boards. As a result, the GetAttribute module may utilize a memory over fabric (MoF) module 450 to fetch the attribute information from remote locations (e.g., on other boards). In some embodiments, the attribute data of the sampled nodes may include one or more features of each of the sampled nodes.

As shown in FIG. 2, FIG. 3 and FIG. 4, the systems can retrieve graph data (e.g., structure data and attribute data) from the local memory (e.g., DDRs or similar memory types). It is appreciated that the systems can be implemented on a field programmable gate arrays (FPGA). As a result, to enable faster memory access, local DDRs can be implemented on the same FPGA.

Figure 5:
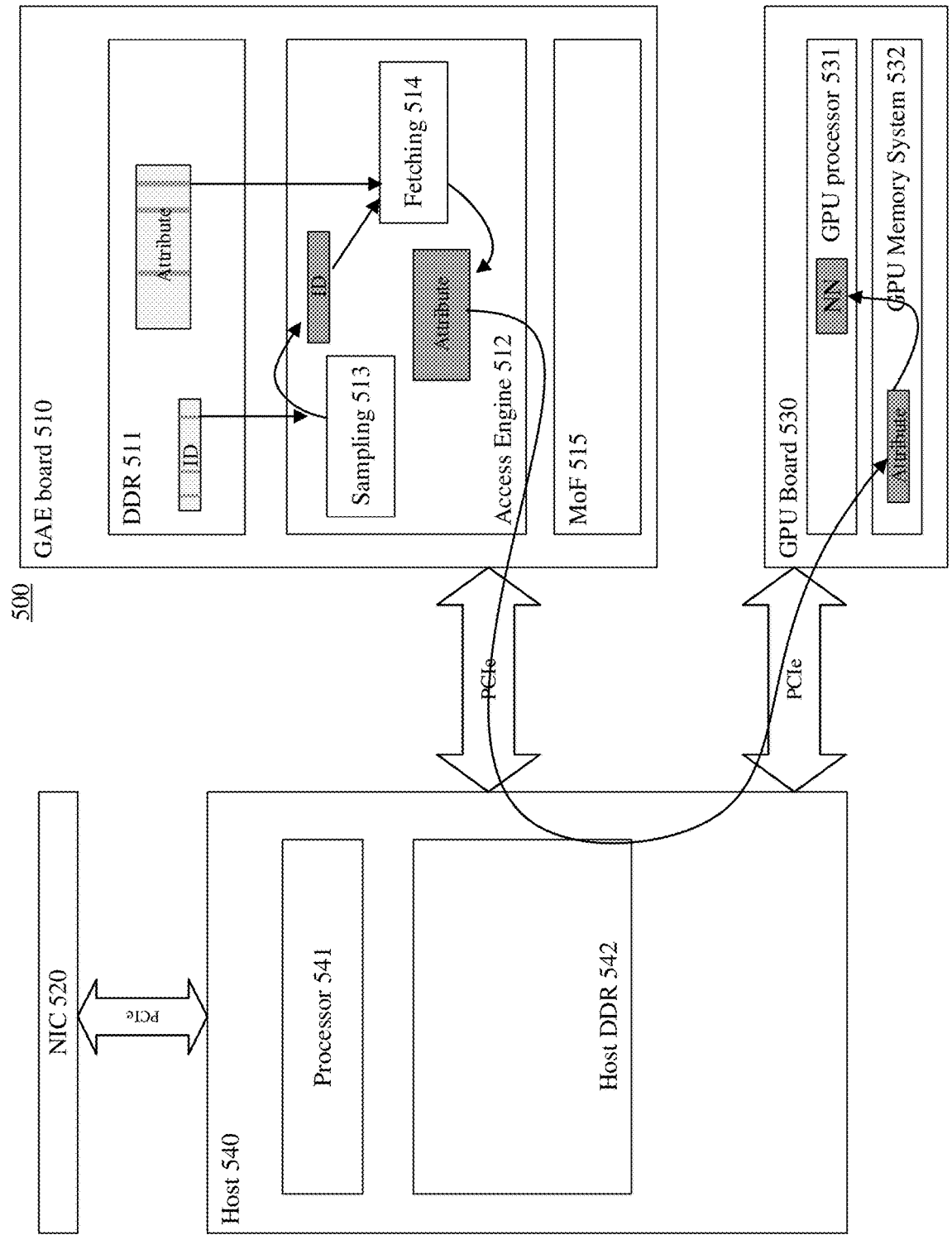
FIG. 5 is a schematic of an example system for accessing GNN data from one or more memories on a circuitry board, according to some embodiments of this specification.

FIG. 5 is a schematic of an example system for accessing GNN data from one or more DDRs on a circuitry board, according to some embodiments of this specification. The schematic in FIG. 5 is for illustrative purposes only, and the system 500 shown in FIG. 5 may have fewer, more, and alternative components and connections depending on the implementation.

As shown in FIG. 5, the system 500 can include a host 540, an graphic access engine ("GAE") board 510, and a GPU board 530. The host 540 is communicatively coupled with the GAE board 510 and the GPU board 530. In some embodiments, the host 540 is communicatively coupled with each of the GAE board 510 and the GPU board 530 via a peripheral component interconnect express ("PCIe") connection. In some embodiments, the host 540 is communicatively coupled (e.g., via a PCIe connections) with a network interface controller ("NIC") 520. The NIC 520 can be configured to connect the host 540 to a computer network (e.g., local network, Internet, etc.), allowing the host 540 to upload to or download data from the computer network.

In some embodiments, the GAE board 510 shown in FIG. 5 may include one or more memories, such as DDRs 511, and an access engine 512. The DDRs 511 and the access engine 512 are communicatively coupled. It is appreciated that the DDRs 511 and the access engine 512 are physically located on the same circuitry board (i.e. the GAE board 510). The DDRs 511 are configured to store graph data, such as structure data (e.g., node identifiers, neighboring nodes, etc.) or attribute data. In some embodiments, the DDRs 511 are configured to store the structure data and the attribute data of the graph data separately. It is appreciated that the DDRs 511 can include one or more DDRs.

In some embodiments, the access engine 512 shown in FIG. 5 is similar to the access engine 310 shown in FIG. 3 or the access engine 400 shown in FIG. 4, and can include one or more modules or circuitries from the access engine 310 or the access engine 400, such as the GetNeighbor module 410, the GetSample module 420, the GetAttribute module 430, or the GetEncode module 440. For example, the access engine 512 can include a sampling module 513 and a fetching module 514. In some embodiments, the access engine 512 is programmed and implemented on the FPGA.

In some embodiments, the sampling module 513 can be configured perform functions similar to GetNeighbor module 410 and GetSample module 420. For example, the sampling module 513 can fetch structure data (e.g., information on one or more nodes, their edges, and their neighbors) from the DDRs 511, perform node sampling, and identify node identifiers of sampled nodes. The sampling module 513 can be further configured to send the node identifiers of the sampled nodes to the fetching module 514.

In some embodiments, the fetching module 514 can be configured to perform functions similar to GetAttribute module 430. For example, the fetching module 514 can fetch attribute data of the sampled nodes from the DDRs 511 based on the node identifiers of the sampled nodes. In some embodiments, after the fetching module 514 fetches the attribute data of the sampled nodes, the access engine 512 can be configured to send the attribute data of the sampled nodes to the host 540. In some embodiments, the graph data may not fit onto the DDRs 511 in its entirety. As a result, the fetching module 512 can be configured to fetch the attribute data of the sampled nodes from another location (e.g., a DDR located off the GAE board 510). For example, the fetching module 512 can be configured to fetch the attribute data from another location via an MoF 515.

In some embodiments, the host 540 can be configured to receive the attribute data of the sampled nodes from the access engine 512, and route the received attribute data of the sampled nodes to the GPU board 530 for GNN processing.

In some embodiments, the GPU board 530 is configured to perform GNN processing. For example, the GPU board 530 can include a GPU processor 531 and a GPU memory system 532. In some embodiments, the GPU memory system 532 includes DDRs configured to store GNN data. In some embodiments, the GPU memory system 532 is a high bandwidth memory (HBM). A typical HBM includes a number of dynamic random-access memory (DRAM) dies that are vertically stacked on top of each other to provide a large storage capacity, e.g., 4 GB, 24 GB, and 64 GB), with a small form factor. In addition, each DRAM die can include two 128-bit data channels to provide a high bandwidth. The GPU board 530 can be configured to store the attribute data of the sampled nodes in the GPU memory system 532. The GPU processor 531 can be configured to fetch from the GPU memory system 532 the attribute data of the sampled nodes, and perform graph neural network processing using the fetched attribute data of the sampled nodes. In some embodiments, the GPU processor 532 is similar to the dedicated processor 240 shown in FIG. 2.

As shown in FIG. 5, DDRs or similar RAMs can be implemented on the same board (e.g., GAE board 510) as the access engine 512 to enable fast memory access for the access engine 512. However, such implementation of local DDRs or similar memories on the FPGA or similar circuitries can be very costly. Moreover, DDRs have a limitation in their memory capacity. For graphs that are large in storage size (e.g., larger than 50 gigabytes), DDRs implemented locally may not be able to store a single graph without incurring significant cost. Although the systems may have the option to fetch graph data from a remote location via MoF (e.g., MoF module 450), such memory access may incur longer delays. Embodiments of the present disclosure provide hardware systems and methods that provide balanced approaches to store and access graph data from memories.

Figure 6:
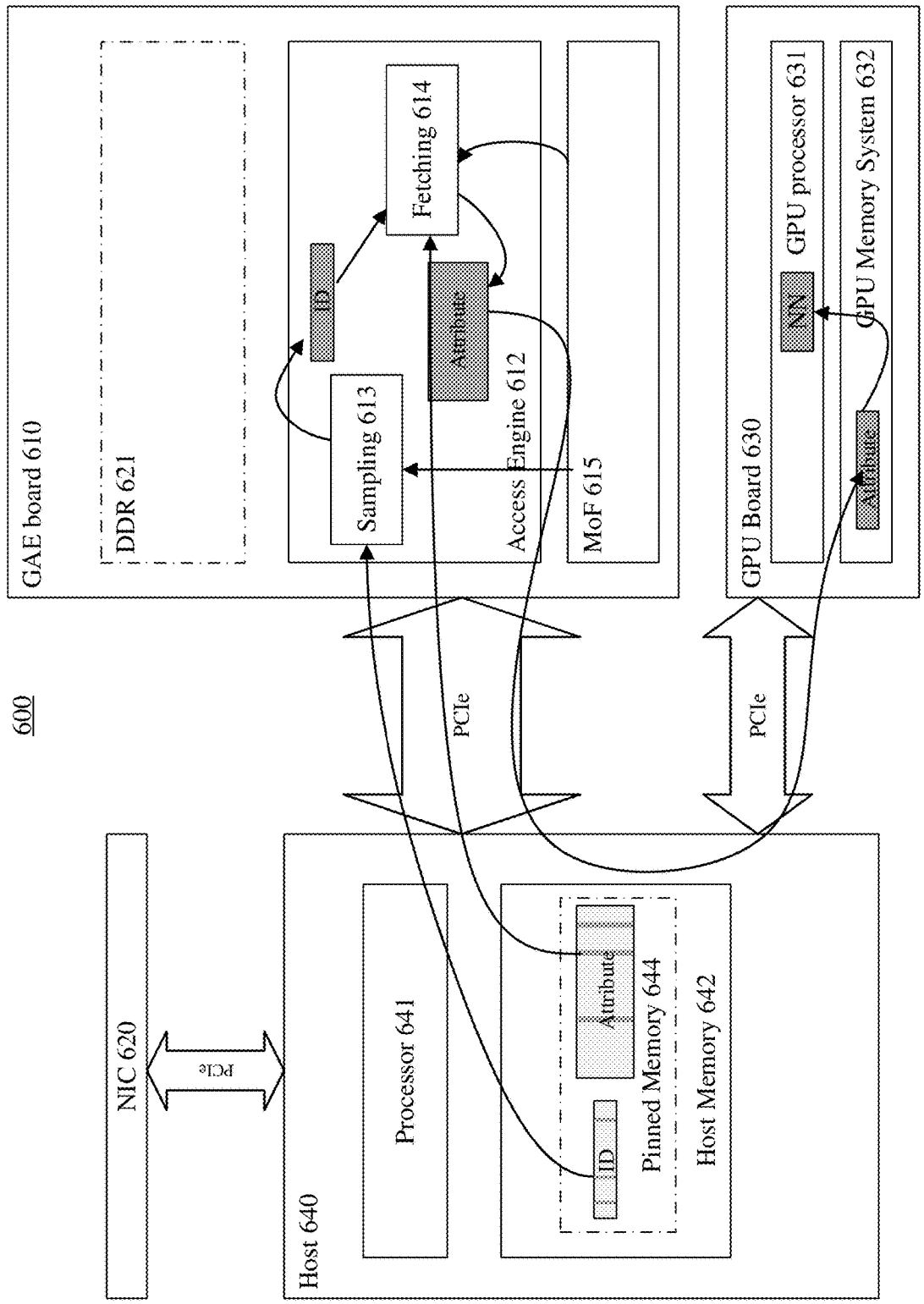
FIG. 6 is a schematic of an example system for accessing GNN data from one or more memories on a host, according to some embodiments of this specification.

FIG. 6 is a schematic of an example system for accessing GNN data from one or more memories on a host, according to some embodiments of this specification. The schematic in FIG. 6 is for illustrative purposes only, and the system 600 shown in FIG. 6 may have fewer, more, and alternative components and connections depending on the implementation.

As shown in FIG. 6, the system 600 can include a host 640, a graphic access engine ("GAE") board 610, and a GPU board 630. The host 640 is communicatively coupled with the GAE board 610 and the GPU board 630. In some embodiments, the host 640 is communicatively coupled with each of the GAE board 610 and the GPU board 630 via a peripheral component interconnect express ("PCIe") connection. In some embodiments, the host 640 is communicatively coupled (e.g., via a PCIe connection) with a network interface controller ("NIC") 620. The NIC 620 can be configured to connect the host 640 to a computer network (e.g., local network, Internet, etc.), allowing the host 640 to upload to or download data from the computer network.

In some embodiments, the host 640 includes a host memory 642. The host memory 642 is configured to store data such as graph data including structure data (e.g., node identifiers, neighboring nodes, etc.) or attribute data. In some embodiments, the host memory 642 is configured to store the structure data and the attribute data of the graph data in separate memory locations. It is appreciated that the host memory 642 can include one or more DDRs.

In some embodiments, the access engine 612 shown in FIG. 6 is similar to the access engine 310 shown in FIG. 3 or the access engine 400 shown in FIG. 4, and can include one or more modules or circuitries from the access engine 310 or the access engine 400, such as the GetNeighbor module 410, the GetSample module 420, the GetAttribute module 430, or the GetEncode module 440. For example, the access engine 612 can include a sampling module 613 and a fetching module 614. In some embodiments, the access engine 612 is programmed and implemented on the FPGA.

In some embodiments, the sampling module 613 can be configured to perform functions similar to GetNeighbor module 410 and GetSample module 420. For example, the sampling module 613 can fetch structure data (e.g., information on one or more nodes, their edges, and their neighbors) from the host memory 642, perform node sampling, and identify node identifiers of sampled nodes. In some embodiments, the sampling module 613 can fetch the structure data from the host memory 642 via the connection (e.g., a PCIe connection) between the host 640 and the GAE board 610. The sampling module 613 can be further configured to send the node identifiers of the sampled nodes to the fetching module 614. In some embodiments, the host memory 642 includes a pinned memory configured to store the graph data that can be accessed by the GAE board 610 or the access engine 612 of the GAE board 610. For example, the pinned memory can be a part of the host memory that are specially marked so that they are reserved for storing the graph data and they may not be paged out (e.g., by an operating system on the host) to be used for other applications or purposes. In some embodiments, the pinned memory can be allocated with special system function calls. In some embodiments, the pinned memory can be returned and used for other applications or purposes through an unpinning command. One advantage of using the pinned memory is that accessing memory pages in the pinned memory may not require a page replacement algorithm and may not lead to a page fault. As shown in FIG. 6, the host memory 642 includes a pinned memory 644. The pinned memory 644 is reserved for storing data (e.g., the graph data) that can be accessed by the GAE board 610 or the access engine 612 of the GAE board 610. As a result, when the sampling module 613 fetches the structure data from the host memory, the sampling module 613 accesses the pinned memory 644 to fetch the structure data.

In some embodiments, the sampling module 613 can be configured to fetch the structure data from a remote location. For example, as shown in FIG. 6, the GAE board 610 further includes an MoF 615 configured to connect the GAE board 610 to one or more other modules, such as one or more other GAE boards. As a result, the sampling module 613 can fetch the structure data stored on other hosts connected to the other GAE boards. Moreover, as shown in FIG. 6, the host 640 can be connected to a network (e.g., via an NIC 620). As a result, the host 640 can be configured to fetch the structure data stored on other hosts via the connected network, and send the fetched structure data to the GAE board 610 (e.g., the sampling module 613 of the GAE board 610). In some embodiments, the host 640 can be skipped in the data fetching process. For example, the GAE board 610 can configure the NIC 620 (e.g., without interference of the host 640), and the GAE board can fetch data stored on other hosts via the NIC 620 (e.g., a random direct memory access (RDMA)-like remote memory access), bypassing the host 640.

In some embodiments, the fetching module 614 can be configured to perform functions similar to GetAttribute module 430. For example, the fetching module 614 can fetch attribute data of the sampled nodes from the host memory 642 based on the node identifiers of the sampled nodes. In some embodiments, the fetching module 614 can fetch the attribute data via the connection (e.g., the PCIe connection) between the host 640 and the GAE board 610. In some embodiments, the fetching module 614 can fetch the attribute data from the pinned memory 644 in the host memory 642.

In some embodiments, after the fetching module 614 fetches the attribute data of the sampled nodes, the access engine 612 can be configured to send the attribute data of the sampled nodes to the host 640. In some embodiments, the fetching module 614 can be configured to fetch the attribute data of the sampled nodes from a remote location. For example, as shown in FIG. 6, the GAE board 610 can include the MoF 615 configured to connect the GAE board 610 to one or more other modules, such as one or more other GAE boards. As a result, the fetching module 614 can fetch the attribute data stored on other hosts connected to the other GAE boards. Moreover, as shown in FIG. 6, the host 640 can be connected to a network (e.g., via the NIC 620). As a result, the host 640 can be configured to fetch the attribute data stored on other hosts via the connected network, and send the fetched attribute data to the GAE board 610 (e.g., the sampling module 613 of the GAE board 610). In some embodiments, the host 640 can be skipped in the data fetching process. For example, the GAE board 610 can configure the NIC 620 (e.g., without interference of the host 640), and the GAE board can fetch data stored on other hosts via the NIC 620 (e.g., a random direct memory access (RDMA)-like remote memory access), bypassing the host 640. It is appreciated that when the GAE board 610 accesses data in the host 640, the data accessing can be considered as accessing a local location, and when the GAE board 610 accesses data via the MoF 615 or the NIC 620, the data accessing can be considered as accessing a remote location.

In some embodiments, the host 540 can be configured to receive the attribute data of the sampled nodes from the access engine 512, and route the received attribute data of the sampled nodes to the GPU board 530 for GNN processing. In some embodiments, the host 540 can be configured to store the received attribute data for further processing (e.g., by the processor 641). In some embodiments, the GAE board 610 can be connected to the GPU board 630 (e.g., via a PCIe connection), and the GAE board 610 is configured to send the attribute data to the GPU board 630 directly.

In some embodiments, the GPU board 630 is configured to perform GNN processing. For example, the GPU board 630 can include a GPU processor 631 and a GPU memory system 632. In some embodiments, the GPU memory system 632 includes DDRs configured to store GNN data. In some embodiments, the GPU memory system 632 is a high bandwidth memory (HBM). A typical HBM includes a number of dynamic random-access memory (DRAM) dies that are vertically stacked on top of each other to provide a large storage capacity, e.g., 4 GB, 24 GB, and 64 GB), with a small form factor. In addition, each DRAM die can include two 128-bit data channels to provide a high bandwidth. The GPU board 630 can be configured to store the attribute data of the sampled nodes in the GPU memory system 632. The GPU processor 631 can be configured to fetch from the GPU memory system 632 the attribute data of the sampled nodes, and perform GNN processing using the fetched attribute data of the sampled nodes. In some embodiments, the GPU processor 632 is similar to the dedicated processor 240 shown in FIG. 2.

As shown in FIG. 6, the graph data (e.g., the structure data and the attribute data) can be stored in the host memory 642 (e.g., the pinned memory 644) of the host 640 or other hosts connected to the host 640 (e.g., via the NIC 620) or connected to one or more other GAE boards which are connected to the GAE board 610 (e.g., via the MoF 615). As a result, the GAE board 610 may not need to store the graph data on its on-board memory, such as an optional DDR 621 (e.g., similar to the DDR 511 shown in FIG. 5). Therefore, the GAE board 610 may be able to avoid the significant cost of implementing DDR memories on board, such as the significant cost of implementing DDR memories on an FPGA. The overall cost efficiency for the system can be improved.

Figure 7:
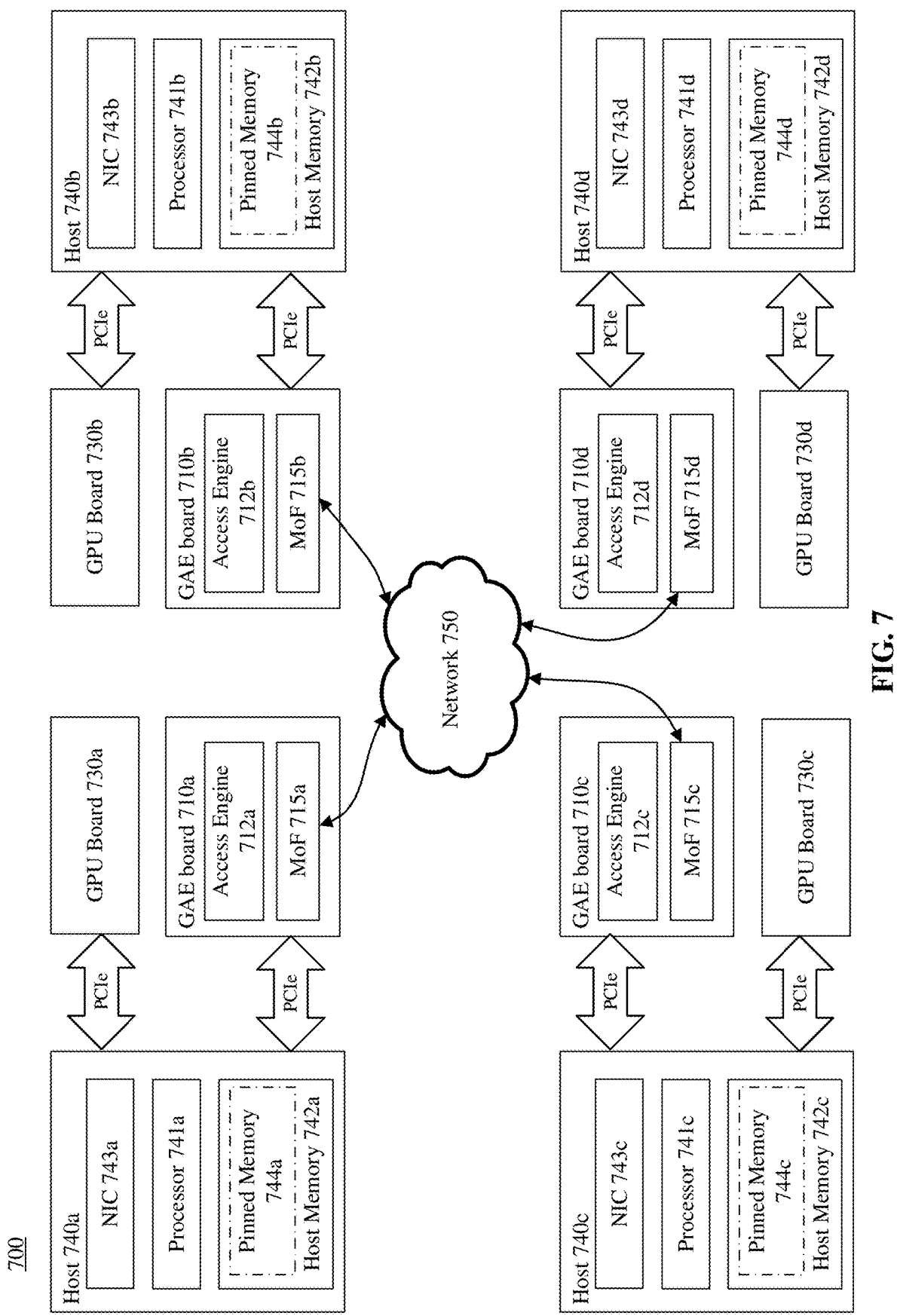
FIG. 7 is a schematic of an example system for accessing GNN data from a plurality of connected graph access engine boards, according to some embodiments of this specification.

In some embodiments, the GAE board 610 is connected to other GAE boards via the MoF 615. FIG. 7 is a schematic of an example system for accessing GNN data from a plurality of connected graph access engine boards, according to some embodiments of this specification. The schematic in FIG. 7 is for illustrative purposes only, and the system 700 shown in FIG. 7 may have fewer, more, and alternative components and connections depending on the implementation.

As shown in FIG. 7, the system 700 includes a plurality of hosts 740*a-d*, a plurality of GPU boards 730*a-d*, and a plurality of GAE boards 710*a-d*. In some embodiments, each of the plurality of hosts 740*a-d* can be similar to the host 640 shown in FIG. 6, each of the plurality of GPU boards 730*a-d* can be similar to the GPU board 630 shown in FIG. 6, and each of the plurality of GAE boards 710*a-d* can be similar to the GAE board 610 shown in FIG. 6.

As shown in FIG. 7, each of the GAE boards 710*a-d* includes an MoF 715. For example, the GAE board 710*a* includes an MoF 715*a*. One or more of the plurality of MoFs 715*a-d* are connected to a network 750. As a result, each of the MoFs 715*a-d* can connect the plurality of GAE boards 710*a-d* to the network 750, and each of the GAE boards 710*a-d* can access data located in other hosts or other GAE boards via the network 750. For example, as shown in FIG. 7, the GAE board 710*a* can access data (e.g., graph data) from a pinned memory 744*b* via the MoF 715*a*, the network 750, the MoF 715*b*, and the connection between the GAE board 710*b* and the host 740*b* (e.g., a PCIe connection). As a result, the modules inside the GAE board 710*a*, such as a sampling module (e.g., similar to the sampling module 613 of FIG. 6) or a fetching module (e.g., similar to the fetching module 614 of FIG. 6), can fetch structure data or attribute data of a graph from the pinned memory 744*b* via the MoF 715*a*, the network 750, the MoF 715*b*, and the connection between the GAE board 710*b* and the host 740*b* (e.g., a PCIe connection).

Figure 8:
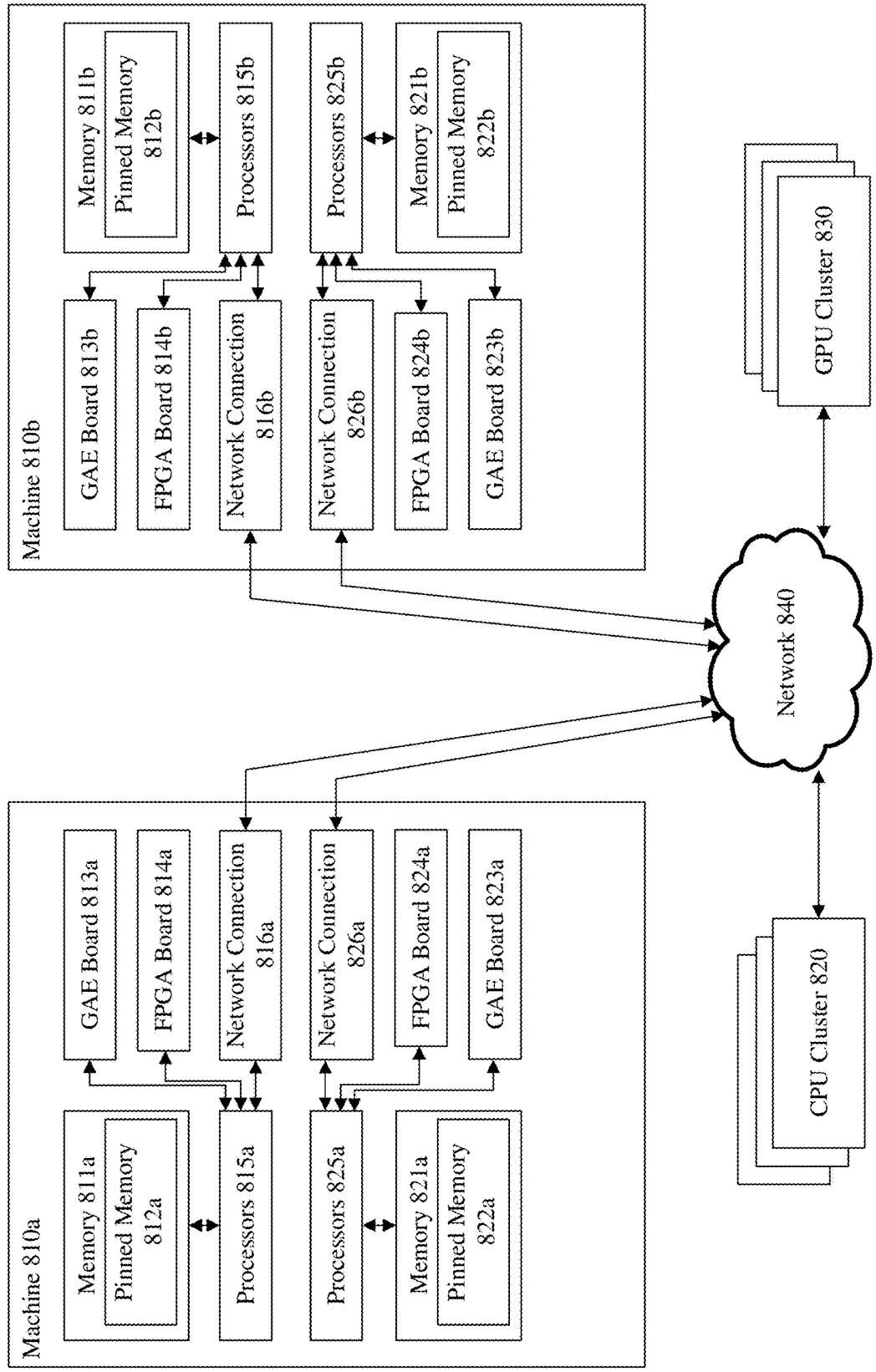
FIG. 8 is a schematic of an example system for accessing GNN data from a plurality of connected machines, according to some embodiments of this specification.

In some embodiments, a network of system can be implemented on a plurality of machines connected by a network. FIG. 8 is a schematic of an example system for accessing GNN data from a plurality of connected machines, according to some embodiments of this specification. The schematic in FIG. 8 is for illustrative purposes only, and the system 800 shown in FIG. 8 may have fewer, more, and alternative components and connections depending on the implementation.

As shown in FIG. 8, the system 800 includes a plurality of machines (e.g., machines 810*a-b*), a CPU cluster, a GPU cluster, and a network 840 connecting the plurality of machines, the CPU cluster, and the GPU cluster.

In some embodiments, the plurality of machines may be a part of a cloud service with each of the plurality of machines comprising one or more FPGAs that can be configured by a user. For example, the machine 810*a* includes FPGA board 814*a* and FPGA board 824*a*. These FPGA boards can be programmed and configured to perform various functions, such as data accessing functions. Moreover, the GAE board 813*a* or the GAE board 823*a* in machine 810*a* can also be one of the many FPGA boards on the machine 810*a* that are programmable by the user. For example, the user can program an FPGA board into the GAE board 813*a* to perform GNN data accessing. Similarly, the user can also program the FPGA board 814*a* into a GAE board to perform GNN data accessing.

In some embodiments, the network 840 includes an ethernet switch configured to connect the plurality of machines, the CPU cluster, and the GPU cluster. In some embodiments, the network 840 includes ethernet fabrics connecting the plurality of machines, the CPU cluster, and the GPU cluster. In some embodiments, the network 840 includes InfiniBand (IB) connections connecting the plurality of machines, the CPU cluster, and the GPU cluster. Each of the plurality of machines can include one or more memories, one or more processors, one or more GAE boards, and one or more network switches. For example, as shown in FIG. 8, the machine 810*a* includes a memory 811*a*, one or more processors 815*a*, a GAE board 813*a*, and a network connection 816*a*.

In some embodiments, the memory 811*a* is similar to the host memory 642 shown in FIG. 6 or one of the host memories 742*a-d* shown in FIG. 7. In some embodiments, the memory 811*a* includes 16 DRAMs, each having a capacity of 16 Gb or more. In some embodiments, the one or more processors 815*a* is similar to the processor 641 shown in FIG. 6 or one of the processors 741*a-d* shown in FIG. 7. In some embodiments, the one or more processors 815*a* includes 32 computing cores. In some embodiments, the GAE board 813*a* is similar to the GAE board 610 shown in FIG. 6 or one of the GAE boards 730*a-d* shown in FIG. 7. In some embodiments, the network connection 816*a* includes an NIC and is configured to provide connections to the network 840 via the NIC (e.g., similar to the NIC 620 shown in FIG. 6 or one of the NICs 743*a-d* shown in FIG. 7). In some embodiments, the memory 811*a* includes a pinned memory 812*a*, which can be similar to the pinned memory 644 shown in FIG. 6 or one of the pinned memories 744*a-d* shown in FIG. 7. In some embodiments, the one or more processors 815*a* are connected to the memory 811*a*, the GAE board 813*a*, and the network connection 816*a*. In some embodiments, the one or more processors 815 is connected to the FPGA board 814*a*, which can be programmed and configured to perform GNN processing (e.g., similar to the GAE board 813*a*) or other types of data processing.

In some embodiments, each of the plurality of machines can include additional processors, memories, GAE boards, or network connections. For example, as shown in FIG. 8, in addition to the memory 811*a*, the one or more processors 815*a*, the GAE board 813*a*, and the network connection 816*a*, the machine 810*a* can further include one or more processors 825*a*, a memory 821*a*, a network connection 826*a*, and the GAE boards 723*a*. As a result, the machine 810 can include multiple connections to the network 840, and data in each of the memories in the system 800 (e.g., memories 811*a*, 821*a*, 811*b*, and 821*b*) can be accessed by each of the processors (e.g., processors 815*a*, 815*b*, 825*a*, and 825*b*) or by each of the GAE boards (e.g., GAE boards 813*a*, 823*a*, 83*b*, and 823*b*). Moreover, the data stored in each of the memories can be accessed by the CPU cluster 820 or the GPU cluster 830 via the network 840.

In some embodiments, the host (e.g., the host 640 of FIG. 6 or one of the hosts of FIG. 7) represents a collection of modules or circuitries, such as the memory 811*a* and the processors 815*a* in the machine 810*a*. As a result, although FIG. 8 does not explicitly show one or more hosts, each of the machines (e.g., machine 810*a* and machine 810*b*) can comprise one or more hosts, which is represented as a collection of one or more memories (e.g., memory 811*a*) or processors (e.g., processors 815*a*). In some embodiments, the CPU cluster 820 or the GPU cluster 830 can also be considered as a part of the host (e.g., as a part of the processors 641 of FIG. 6).

Figure 9:
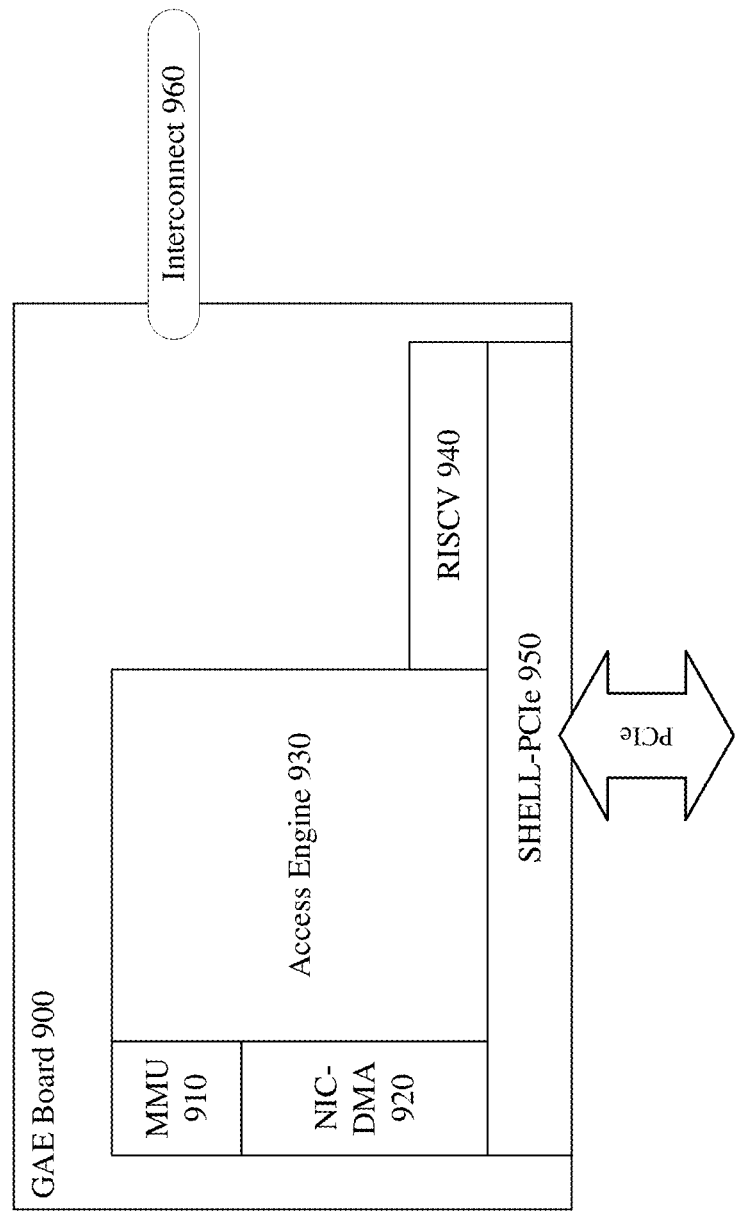
FIG. 9 is a schematic of an example graphic access engine board, according to some embodiments of this specification.

In some embodiments, the GAE board can be implemented on an application-specific integrated circuit (ASIC) or an FPGA. FIG. 9 is a schematic of an example graphic access engine board, according to some embodiments of this specification. The schematic in FIG. 9 is for illustrative purposes only, and the GAE board 900 shown in FIG. 9 may have fewer, more, and alternative components and connections depending on the implementation. In some embodiments, the GAE board 900 is similar to the GAE board 610 shown in FIG. 6, one of the GAE boards 710*a-d* shown in FIG. 7, or one of the GAE boards shown in FIG. 8.

As shown in FIG. 9, the GAE board 900 includes an access engine 930, a RISCV processor 940, a memory management unit (MMU) 910, an NIC-DMA (direct memory access) module 920, and a shell-PCIe module 950. In some embodiments, the access engine 930 is similar to the access engine 612 shown in FIG. 6 or one of the access engines 712*a-d* shown in FIG. 7. In some embodiments, the RISCV processor 940 is configured to process controlling commands. In some embodiments, The RISCV processor 940 is similar to the RISCV 330 shown in FIG. 3. In some embodiments, the MMU 910 is configured to perform memory management processes, such as address translations. In some embodiments, the NIC-DMA module 920 is configured to facilitate communications with host memories (e.g., the host memory 644 shown in FIG. 6, one of the host memories 742*a-d* shown in FIG. 7, or one of the memories shown in FIG. 8) or host NICs (e.g., NIC 620 shown in FIG. 6, one of the NICs 743*a-d* shown in FIG. 7, or one of the network connections shown in FIG. 8). For example, as shown in FIG. 8, the GAE board 813a can access data in the memory 811b through a network connection 816a. As a result, the NIC-DMA module 920 can facilitate the communications through a network connection involving an NIC. In some embodiments, the shell-PCIe module 950 is configured to facilitate communications over the PCIe connection (e.g., the PCIe connection between the host 540 and the GAE board 510 shown in FIG. 6).

In some embodiments, the GAE board 900 does not have a dedicated DRAM, SDRAM, or DDR that is configured to store a large amount of graph data. For example, the GAE board 900 does not have a DDR 511 shown in FIG. 5. As a result, when the GAE board 900 needs to access graph data, the GAE board 900 is configured to access a host memory or a host NIC via the shell-PCIe module 950. Therefore, the GAE board 900 may be able to avoid the significant cost of implementing DRAM, SDRAM, or DDR memories on board, such as the significant cost of implementing DDR memories on an FPGA. The cost-efficiency of the system can be improved.

In some embodiments, the GAE board 900 further includes an interconnect 960 configured to connect the GAE board 900 with other modules. For example, the interconnect 960 can connect the GAE board 900 with other GAE boards or other FPGAs (e.g., one or more of the FPGAs shown in FIG. 8). In some embodiments, the interconnect 960 is a fabric connection. In some embodiments, the interconnect 960 can provide a bandwidth of 100 Gbps or more. In some embodiments, the interconnect 960 has a form factor of two QSFP28 ports, with each of the QSFP28 providing a bandwidth of 50 Gbps or more.

Figure 10:
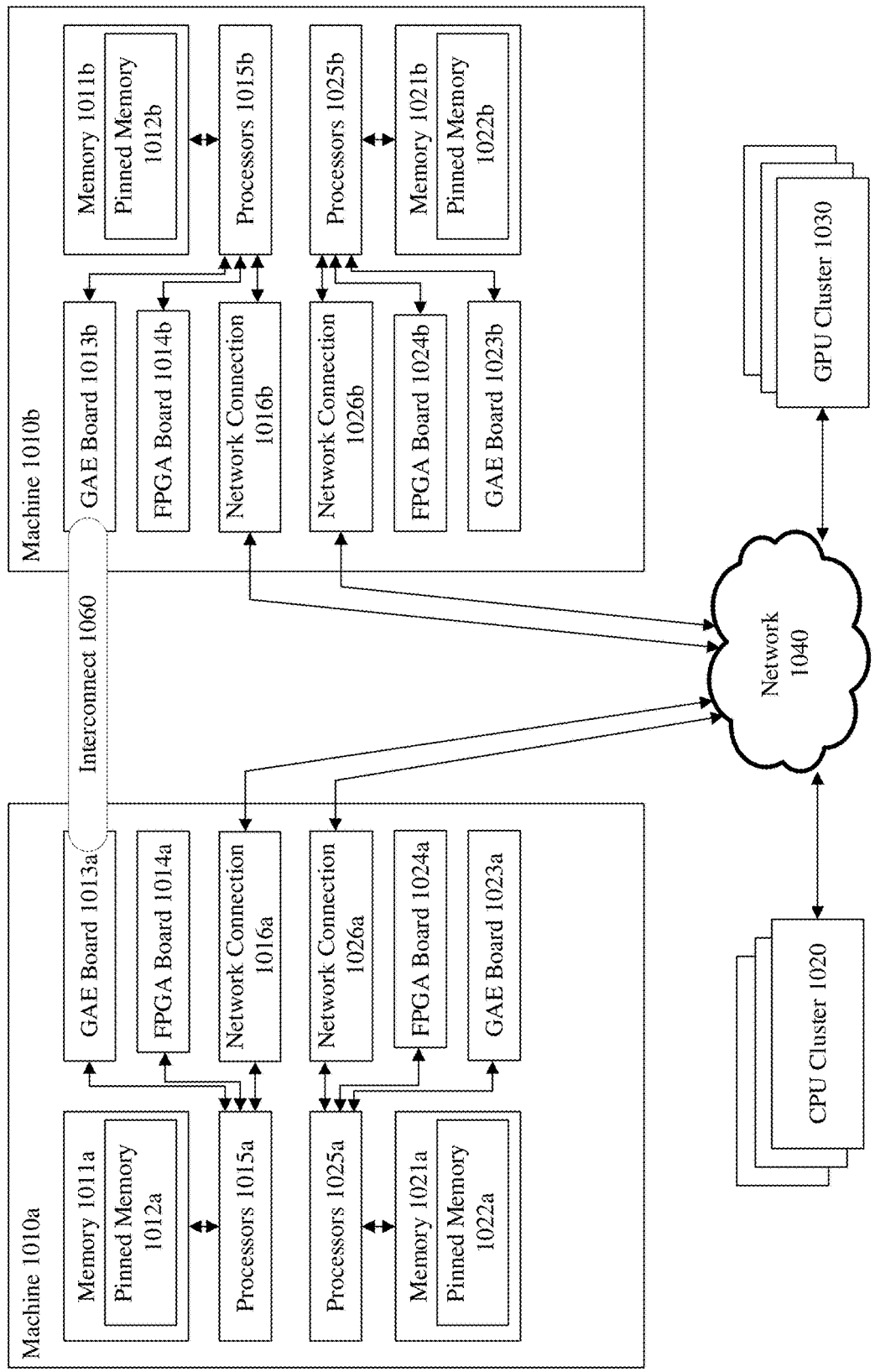
FIG. 10 is a schematic of an example system for accessing GNN data from a plurality of connected machines with chip-to-chip interconnect, according to some embodiments of this specification.

FIG. 10 is a schematic of an example system for accessing GNN data from a plurality of connected machines with chip-to-chip interconnect, according to some embodiments of this specification. The schematic in FIG. 10 is for illustrative purposes only, and the system 1000 shown in FIG. 10 may have fewer, more, and alternative components and connections depending on the implementation.

As shown in FIG. 10, the system 1000 can be similar to the system 800 shown in FIG. 8. For example, a machine 1010a shown in FIG. 10 can be similar to the machine 810a shown in FIG. 8, and a machine 1010b shown in FIG. 10 can be similar to the machine 810b shown in FIG. 8. In addition to the one or more machines or modules shown in FIG. 8, the system 1000 shown in FIG. 10 further includes an interconnect 1060 configured to connect a GAE board 1013a of the machine 1010a and a GAE board 1013b of the machine 1010b. In some embodiments, the interconnect 1060 is similar to the interconnect shown in FIG. 9. As a result, the interconnect 1060 can provide a direct chip-to-chip connection between the GAE board 1013a and the GAE board 1013b. In some embodiments, the GAE board 1013a further includes an MoF (e.g., the MoF 615 shown in FIG. 6 or one of the MoFs 715a-d shown in FIG. 7) configured to facilitate the communication through the interconnect 1060. This direct connection can further facilitate the data access between the two GAE boards and the memories connected to the two GAE boards. For example, if the GAE board 1013 needs to access data (e.g., graph data) located in the memory 1011b (e.g., pinned memory 1012b), the GAE board 1013 can fetch the data via the interconnect 1060 and the GAE board 1013b. In some embodiments, the GAE board 1013a may include multiple interconnects that are similar to the interconnect 1060, and one or more of the multiple interconnects can be configured to connect the GAE board 1013a to other GAE boards (e.g., GAE board 1013b or 1023b).

As shown in FIG. 10, the direct chip-to-chip interconnect, such as the interconnect 1060, can enable faster data accessing from remote locations. As a result, the GAE boards may be able to avoid or reduce the data accessing through the network 1040 and the network connections, which can incur longer delays and add high strains on the network connections. Therefore, the overall efficiency in data accessing from remote locations, such as the GAE board 1013a accessing structure data or attribute data from the GAE board 1013b, can be improved through the use of the interconnects (e.g., the interconnect 1060).

Figure 11:
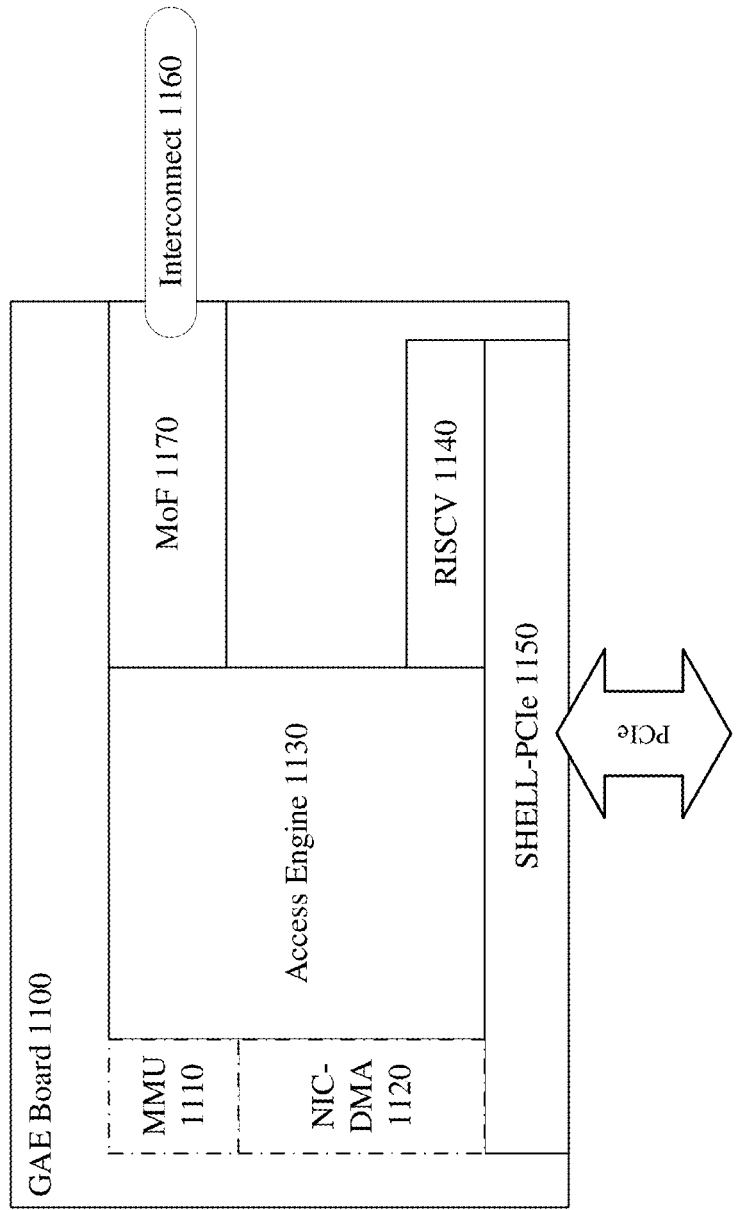
FIG. 11 is a schematic of an example graphic access engine board with a memory over fabric connection, according to some embodiments of this specification.

FIG. 11 is a schematic of an example graphic access engine board with a memory over fabric connection, according to some embodiments of this specification. The schematic in FIG. 11 is for illustrative purposes only, and the system 1100 shown in FIG. 11 may have fewer, more, and alternative components and connections depending on the implementation.

As shown in FIG. 11, the GAE board 1100 includes one or more modules that are similar to the GAE board 900 shown in FIG. 9. For example, an access engine 1130 can be similar to the access engine 930 shown in FIG. 9, a RISCV processor 1140 can be similar to the RISCV processor 940 shown in FIG. 9, a shell-PCIe 1150 can be similar to the shell-PCIe 950 shown in FIG. 9, and an interconnect 1160 can be similar to the interconnect 960 shown in FIG. 9. The GAE board 1100 further includes an MoF 1170 configured to facilitate communications between the GAE board 1100 and other GAE boards or modules (e.g., FPGAs (e.g., FPGA boards shown in FIG. 8 or FIG. 10)) via the interconnect 1160. In some embodiments, the MoF 1170 is similar to the MoF 615 shown in FIG. 6, or one of the MoFs 715a-d.

In some embodiments, the GAE board 1100 further includes an MMU 1110 (similar to the MMU 910 shown in FIG. 9) or an NIC-DMA module 1120 (similar to the NIC-DMA module 920 shown in FIG. 9). In some embodiments, the GAE board 1110 may rely on the MoF 1170 for remote data accessing. For example, the GAE board 1110 may fetch data (e.g., graph data) from a remote location (e.g., pinned memory on other hosts or machines) via the interconnect 1160 and the MoF 1170. As a result, the GAE board 1100 may not include the MMU 1110 or the NIC-DMA 1120 for remote data accessing, hence simplifying the design of the GAE board 1100 and improving the overall efficiency of the system. In some embodiments, similar to the GAE board 900 shown in FIG. 9, the GAE board 1100 can fetch data from a local location (e.g., a pinned memory in a host that is connected to the GAE board 1100 via PCIe) via the shell-PCIe 1150.

Figure 12:
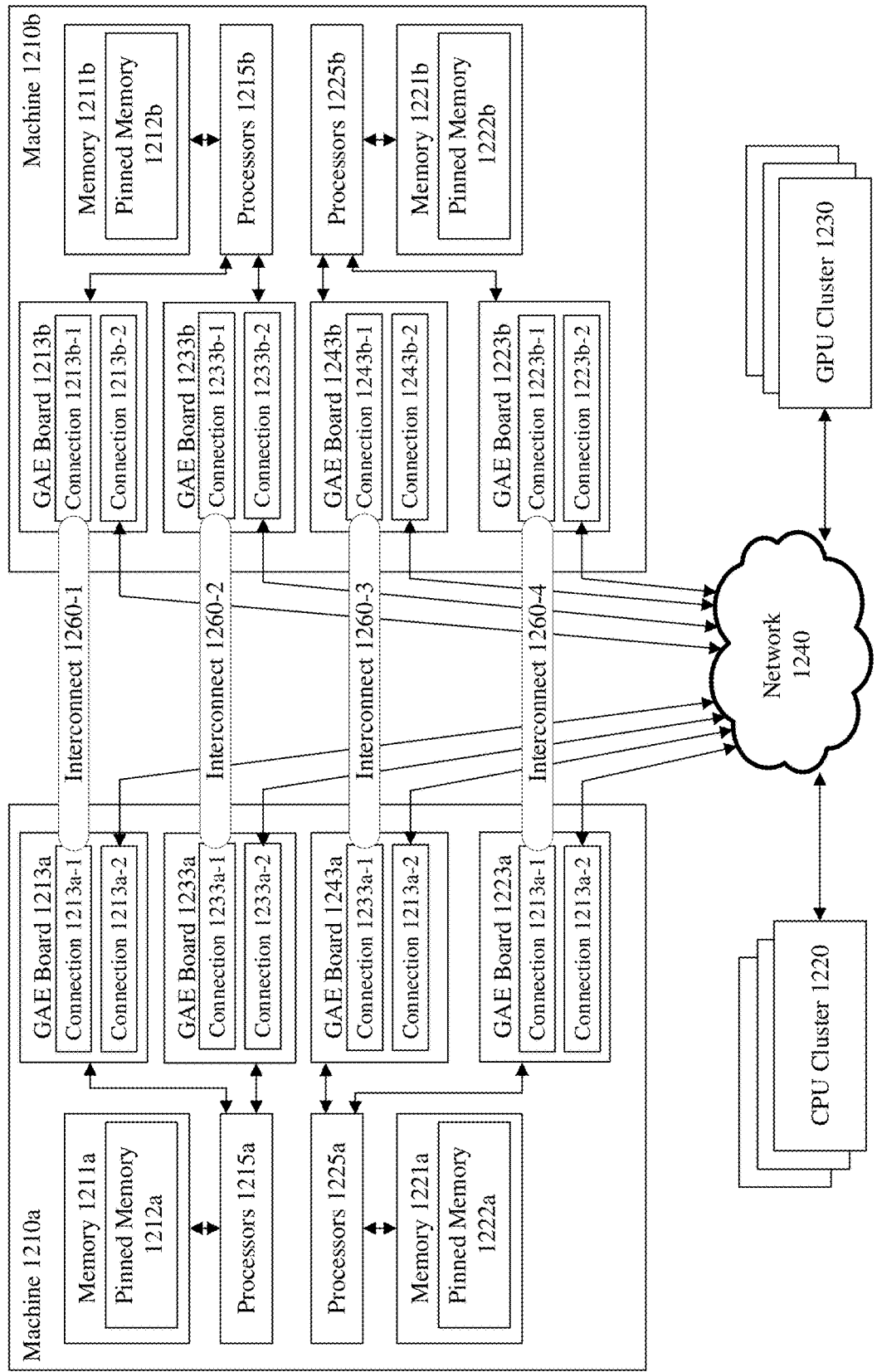
FIG. 12 is a schematic of an example system for accessing GNN data from a plurality of connected machines with chip-to-chip interconnects and cluster connections, according to some embodiments of this specification.

In some embodiments, the GAE board can be configured to include connections for both chip-to-chip connection and cluster connection. FIG. 12 is a schematic of an example system for accessing GNN data from a plurality of connected machines with chip-to-chip interconnects and cluster connections, according to some embodiments of this specification. The schematic in FIG. 12 is for illustrative purposes only, and the system 1200 shown in FIG. 12 may have fewer, more, and alternative components and connections depending on the implementation.

As shown in FIG. 12, the system 1200 includes a plurality of machines, such as a machine 1210a and a machine 1210b. In some embodiments, each of the machines in the system 1200 can be similar to one of the machines shown in FIG. 10, and can include one or more similar modules. For example, as shown in FIG. 12, the machine 1210a can include a memory 1211a (e.g., similar to the memory 1011a shown in FIG. 10), one or more processors 1215a (e.g., similar to the one or more processors 1015*a* shown in FIG. 10), and GAE boards 1213*a* and 1233*a* (e.g., similar to the GAE board 1013*a* shown in FIG. 10).

In some embodiments, each of the GAE boards in the system 1200 can be configured to include direct chip-to-chip connections or network connections. For example, as shown in FIG. 12, GAE board 1213*a* includes a connection 1213*a*-1 and a connection 1213*a*-2. The connection 1213*a*-1 can be configured to provide a chip-to-chip connection through interconnect 1260-1 to the GAE board 1213*b* of the machine 1210*b*. The connection 1213*a*-2 can be configured to provide a network connection to a network 1240. In some embodiments, the interconnect 1260-1, together with other interconnects 1260-2, 1260-3, and 1260-4, can be similar to the interconnect 1060 shown in FIG. 10 or the interconnect 1160 shown in FIG. 11. In some embodiments, the network 1240 can be similar to the network 1040 shown in FIG. 10. Since the GAE boards in the system 1200 can be configured to include network connections, the plurality of machines in the system 1200 may no longer need to include additional network connections configured to connect to network 1040. For example, the system 1200 may not include network connections that are similar to the network connections 1016*a*, 1026*a*, 1016*b*, or 1026*b* shown in FIG. 10. Therefore, the GAE boards no longer need to utilize additional modules (e.g., the processors shown in FIG. 10) to access the network 1240 and subsequently other GAE boards, hence improving the efficiency in fetching and accessing data stored in a remote location. In some embodiments, each of the GAE boards can include more than two connections. For example, the GAE board 1213*a* can include additional connections configured to provide direct chip-to-chip connections with other GAE boards (e.g., GAE boards 1223*b*, 1233*b*, 1243*b*, etc.).

FIG. 13 is an example method for accelerating GNN processing with a host memory, according to some embodiments of this specification. The method 1300 may be implemented in an environment shown in FIGS. 6-12. Depending on the implementation, the method 1300 may include additional, fewer, or alternative steps performed in various orders or parallel.

Step 1310 includes fetching a portion of structure data of a graph from a pinned memory in a host memory of a host by an access engine circuitry implemented on a circuitry board. In some embodiments, the fetching is performed by the access engine circuitry (e.g., the access engine 612 of FIG. 6, one of the access engines 712*a*-*d* of FIG. 7, the access engine 900 of FIG. 9, or the access engine 1130 of FIG. 11). In some embodiments, the access engine circuitry is implemented on a circuitry board (e.g., the GAE board 610 of FIG. 6, one of the GAE boards 710*a*-*d* of FIG. 7, one of the GAE boards of FIG. 8, the GAE board 900 of FIG. 9, one of the GAE boards of FIG. 10, the GAE board 1100 of FIG. 11, and one of the GAE boards of FIG. 12). In some embodiments, the access engine circuitry is implemented on an FPGA. In some embodiments, the host memory includes DRAM, SDRAM, or DDR. In some embodiments, The host memory includes a pinned memory (e.g., the pinned memory 642 of FIG. 6, one of the pinned memories 742*a*-*d* of FIG. 7, one of the pinned memories of FIG. 8, one of the pinned memories of FIG. 10, and one of the pinned memories of FIG. 12). In some embodiments, the portion of the structure data is fetched from the pinned memory.

In some embodiments, the access engine circuitry is communicatively coupled with another access engine circuitry via an interconnect (e.g., a fabric interconnect). For example, similar to FIG. 12, the GAE board 1213*a* is connected to the GAE board 1213*b* via the interconnect 1260-1. As a result, the access engine circuitry can fetch other portions of the structure data of the graph from the other access engine circuitry via the interconnect. For example, As shown in FIG. 12, the GAE board 1213*a* can fetch graph data from the memory 1211*b* communicatively coupled with the GAE board 1213*b* via the interconnect 1260-1. It is appreciated that the graph data being fetched can be both structure data and attribute data.

In some embodiments, the host is communicatively coupled with another host via a network connection. For example, as shown in FIG. 8, the collection of the memory 811*a* and the processors 815*a* (e.g., as a host) is communicatively coupled to the network 840 via the network connection 816*a*. The network 840 is communicatively coupled with a plurality of hosts or machines. As a result, the access engine circuitry can fetch another portion of the graph data from a remote location via the network connection. It is appreciated that the graph data being fetched can be both structure data and attribute data.

Step 1320 includes performing node sampling using the fetched portion of the structure data of the graph to select one or more sampled nodes. In some embodiments, the node sampling is performed by the access engine circuitry. In some embodiments, the node sampling is performed in a similar manner as the GetNeighbor module 410 of FIG. 4, GetSample module 420 of FIG. 4, or the sampling module 613 of FIG. 6.

Step 1330 includes fetching a portion of attribute data of the graph the host memory according to the selected one or more sampled nodes. In some embodiments, the portion of the attribute data of the graph is fetched by the access engine circuitry. In some embodiments, the portion of the attribute data of the graph is fetched from the pinned memory.

In some embodiments, the access engine circuitry is communicatively coupled with another access engine circuitry via an interconnect (e.g., a fabric interconnect). For example, similar to FIG. 12, the GAE board 1213*a* is connected to the GAE board 1213*b* via the interconnect 1260-1. As a result, the access engine circuitry can fetch other portions of the attribute data of the graph from the other access engine circuitry via the interconnect. For example, As shown in FIG. 12, the GAE board 1213*a* can fetch graph data from the memory 1211*b* communicatively coupled with the GAE board 1213*b* via the interconnect 1260-1. It is appreciated that the graph data being fetched can be both structure data and attribute data.

In some embodiments, the host is communicatively coupled with another host via a network connection. For example, as shown in FIG. 8, the collection of the memory 811*a* and the processors 815*a* (e.g., as a host) is communicatively coupled to the network 840 via the network connection 816*a*. The network 840 is communicatively coupled with a plurality of hosts or machines. As a result, the access engine circuitry can fetch another portion of the graph data (e.g., attribute data) from a remote location via the network connection. It is appreciated that the graph data being fetched can be both structure data and attribute data.

Step 1340 includes sending the fetched portion of the attribute data of the graph to one or more processors. In some embodiments, the one or more processors are similar to the GPU processors 631 or the GPU board 630 of FIG. 6, or one of the GPU boards in FIG. 7. In some embodiments, the fetched portion of the attribute data of the graph is sent by the access engine circuitry. In some embodiments, the one or more processors are a part of the host (e.g., the processors 741*a* in the host 740*a* shown in FIG. 7). As a result, the fetched portion of the attribute data can be sent to the one or more processors via the PCIe connection connecting the host with the circuitry board. In some embodiments, the circuitry board is connected with the one or more processors with another connection (e.g., a PCIe connection), and the fetched portion of the attribute data can be sent to the one or more processors via the other PCIe connection connecting the circuitry board with the one or more processors. In some embodiments, the host can forward the attribute data to the one or more processors (e.g., via PCIe connection connecting the host with the one or more processors).

Step 1350 includes performing GNN processing for the graph using the fetched portion of the attribute data. In some embodiments, the GNN processing is performed by the one or more processors. In some embodiments, the one or more processors include one or more CPUs, GPUs, NPUs, dedicated graph neural network processing units, etc. In some embodiments, the portion of the attribute data of the graph can be stored in DDR SDRAM (e.g., host DDR 542 of FIG. 5 or host DDR 712 of FIG. 7), which can be similar to the GPU memory system 632 shown in FIG. 6. The DDR SDRAM can facilitate the one or more processors to perform the GNN processing. In some embodiments, the host is communicatively coupled with a plurality of the circuitry boards, and the host is configured to communicate with each of the plurality of the circuitry boards in parallel. The plurality of the circuitry boards can be configured to store the graph data of the graph. In some embodiments, the host can be configured to perform memory management on the plurality of the circuitry boards using open-channel controllers of a plurality of access engine circuitries in the plurality of the circuitry boards.

It is appreciated that the graph data, including the structure data and the attribute data, is used merely as examples in describing the systems and the methods of this specification. It is appreciated that the graph data is unstructured data, and a person skilled in the art may configure the systems and the methods of this specification to access other types of unstructured data. For example, the unstructured data can be stored in a pinned memory (e.g., the pinned memory 644 of FIG. 6) of a host memory (e.g., the host memory 642 of FIG. 6) in a host (e.g., the host 640 of FIG. 6), and an access engine (e.g., access engine 612) connected to the host can fetch the unstructured data from the pinned memory, perform sampling on the unstructured data, fetch other portions of the unstructured data from the pinned memory based on the sampling, and send the other portions of the fetched data to one or more processors (e.g., GPU processor 631 of FIG. 6) for further processing.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may include a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be included in program codes or instructions stored in a memory (e.g., a non-transitory computer-readable storage medium described above). Such algorithm may include a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system, comprising:
a host comprising a host memory;
one or more processors; and
a circuitry board,
wherein:
the circuitry board is communicatively coupled with the host via a first peripheral component interconnect express (PCIe) connection, the circuitry board comprising:
an access engine circuitry configured to:
fetch a portion of structure data of a graph from a pinned memory in the host memory via the first PCIe connection;
perform node sampling using the fetched portion of the structure data to select one or more sampled nodes of the graph;
fetch a portion of attribute data of the graph from the pinned memory via the PCIe first connection according to the selected one or more sampled nodes; and
send the fetched portion of the attribute data of the graph to the one or more processors, and
the one or more processors are configured to perform graph neural network (GNN) processing for the graph using the portion of the attribute data of the graph.

2. The system of claim 1, wherein the circuitry board is implemented on a field programmable gate array (FPGA) located on the circuitry board.

3. The system of claim 1, wherein:
the one or more processors are a part of the host, and
the access engine circuitry is further configured to send the fetched portion of the attribute data of the graph to the one or more processors via the first PCIe connection.

4. The system of claim 3, wherein:
the access engine circuitry is communicatively coupled with another access engine circuitry via a fabric interconnect, and
the access engine circuitry is further configured to:
fetch another portion of the structure data of the graph from the other access engine circuitry via the fabric interconnect;
perform node sampling using the fetched portions of the structure data to select one or more sampled nodes of the graph;
fetch another portion of the attribute data of the graph from the other access engine circuitry via the fabric interconnect according to the selected one or more sampled nodes; and
send the fetched portions of the attribute data of the graph to the one or more processors, and
the one or more processors are further configured to perform graph neural network (GNN) processing for the graph using the portions of the attribute data of the graph.

5. The system of claim 1, wherein:
the one or more processors are communicatively coupled with the host via a second PCIe connection, and
the access engine circuitry is further configured to send the fetched portion of the attribute data of the graph to the one or more processors via the first PCIe connection to the host, which is further configured to forward the fetched portion of the attribute data via the second PCIe connection to the one or more processors.

6. The system of claim 1, wherein:
the host is communicatively coupled with another host via a network connection, and
the access engine circuitry is further configured to:
fetch another portion of the structure data of the graph from the other host via the network connection;
perform node sampling using the fetched portions of the structure data to select one or more sampled nodes of the graph;
fetch another portion of the attribute data of the graph from the other host via the network connection according to the selected one or more sampled nodes; and
send the fetched portions of the attribute data of the graph to the one or more processors, and
the one or more processors are further configured to perform graph neural network (GNN) processing for the graph using the portions of the attribute data of the graph.

7. The system of claim 1, wherein the one or more processors are central processing units (CPUs), graphics processing units (GPUs), tensor processing units (TPU), neural processing units (NPUs), or graph neural network processing units.

8. The system of claim 1, wherein:
the circuitry board is communicatively coupled with another circuitry board via a network connection, and
the access engine circuitry is further configured to:
fetch another portion of the structure data of the graph from the other circuitry board via the network connection;
perform node sampling using the fetched portions of the structure data to select one or more sampled nodes of the graph;
fetch another portion of the attribute data of the graph from the other circuitry board via the network connection according to the selected one or more sampled nodes; and
send the fetched portions of the attribute data of the graph to the one or more processors, and
the one or more processors are further configured to perform graph neural network (GNN) processing for the graph using the portions of the attribute data of the graph.

9. A computer-implemented method, comprising:
fetching, by an access engine circuitry implemented on a circuitry board, a portion of structure data of a graph from a pinned memory in a host memory of a host via a first peripheral component interconnect express (PCIe) connection, wherein the access engine circuitry is communicatively coupled with the host via the first PCIe connection;
performing, by the access engine circuitry, node sampling using the fetched portion of the structure data of the graph to select one or more sampled nodes;
fetching, by the access engine circuitry, a portion of attribute data of the graph from the pinned memory via the first PCIe connection;
sending, by the access engine circuitry, the fetched portion of the attribute data of the graph to one or more processors; and
performing, by the one or more processors, graph neural network (GNN) processing for the graph using the fetched portion of the attribute data of the graph.

10. The method of claim 9, wherein the circuitry board is implemented on a field programmable gate array (FPGA) located on the circuitry board.

11. The method of claim 9, wherein:
the one or more processors are a part of the host, and
sending, by the access engine circuitry, the fetched portion of the attribute data of the graph to one or more processors comprises:
sending, by the access engine circuitry, the fetched portion of the attribute data of the graph to one or more processors via the first PCIe connection.

12. The method of claim 11, wherein:
the access engine circuitry is communicatively coupled with another access engine circuitry via a fabric interconnect, and
the method further comprises:
fetching, by the access engine circuitry, another portion of the structure data of the graph from the other access engine circuitry via the fabric interconnect.

13. The method of claim 9, wherein:
the one or more processors are communicatively coupled with the host via a second PCIe connection, and
sending, by the access engine circuitry, the fetched portion of the attribute data of the graph to one or more processors comprises:
sending, by the access engine circuitry, the fetched portion of the attribute data of the graph to the host via the first PCIe connection, and
forwarding, by the host, the fetched portion of the attribute data to the one or more processors via the second PCIe connection.

14. The method of claim 9, wherein:
the host is communicatively coupled with another host via a network connection, and
the method further comprises:
fetching, by the access engine circuitry, another portion of the structure data of the graph from the other host via the network connection.

15. The method of claim 9, wherein:
the circuitry board is communicatively coupled with another circuitry board via a network connection, and
the method further comprises:
fetching, by the access engine circuitry, another portion of the structure data of the graph from the other circuitry board via the network connection.

16. Non-transitory computer-readable storage media storing instructions that, when executed by one or more processors, cause the one or more processors to perform operations comprising:
fetching, by an access engine circuitry implemented on a circuitry board, a portion of structure data of a graph from a pinned memory in a host memory of a host via a first peripheral component interconnect express (PCIe) connection, wherein the access engine circuitry is communicatively coupled with the host via the first PCIe connection;
performing, by the access engine circuitry, node sampling using the fetched portion of the structure data of the graph to select one or more sampled nodes;
fetching, by the access engine circuitry, a portion of attribute data of the graph from the pinned memory via the first PCIe connection;
sending, by the access engine circuitry, the fetched portion of the attribute data of the graph to one or more dedicated processors; and
performing, by the one or more dedicated processors, graph neural network (GNN) processing for the graph using the fetched portion of the attribute data of the graph.

17. The non-transitory computer-readable storage media of claim 16, wherein the access engine circuitry is implemented on a field programmable gate array (FPGA) located on the circuitry board.

18. The non-transitory computer-readable storage media of claim 16, wherein:
the one or more dedicated processors are a part of the host, and
sending, by the access engine circuitry, the fetched portion of the attribute data of the graph to one or more processors comprises:
sending, by the access engine circuitry, the fetched portion of the attribute data of the graph to one or more processors via the first PCIe connection.

19. The non-transitory computer-readable storage media of claim 18, wherein:
the access engine circuitry is communicatively coupled with another access engine circuitry via a fabric interconnect, and the access engine circuitry is communicatively coupled with another access engine circuitry via a fabric interconnect, and
the operations further comprise:
fetching, by the access engine circuitry, another portion of the structure data of the graph from the other access engine circuitry via the fabric interconnect.

20. The non-transitory computer-readable storage media of claim 16, wherein:
the circuitry board is communicatively coupled with another circuitry board via a network connection, and
the operations further comprise:
fetching, by the access engine circuitry, another portion of the structure data of the graph from the other circuitry board via the network connection.

* * * * *